(12) United States Patent
Kravtsov et al.

(10) Patent No.: US 10,027,442 B2
(45) Date of Patent: Jul. 17, 2018

(54) APPARATUS, SYSTEM AND METHOD OF COMMUNICATING A SINGLE CARRIER (SC) SPACE TIME BLOCK CODE (STBC) TRANSMISSION

(71) Applicant: INTEL IP CORPORATION, Santa Clara, CA (US)

(72) Inventors: Vladimir Kravtsov, Jerusalem (IL); Artyom Lomayev, Nizhny Novgorod (RU); Iaroslav P. Gagiev, Nizhny Novgorod (RU); Alexander Maltsev, Nizhny Novgorod (RU); Michael Genossar, Modiin (IL); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/394,864

(22) Filed: Dec. 30, 2016

(65) Prior Publication Data

US 2018/0026750 A1 Jan. 25, 2018

Related U.S. Application Data

(60) Provisional application No. 62/364,420, filed on Jul. 20, 2016.

(51) Int. Cl.
*H04L 1/02* (2006.01)
*H04L 1/06* (2006.01)
*H04L 27/26* (2006.01)

(52) U.S. Cl.
CPC .......... *H04L 1/0643* (2013.01); *H04L 27/265* (2013.01)

(58) Field of Classification Search
CPC .................. H04L 1/0643; H04L 27/265
See application file for complete search history.

(56) References Cited

U.S. PATENT DOCUMENTS 7,095,731 B2 * 8/2006 Kim .............. H04B 1/707
370/335

2004/0047284 A1 * 3/2004 Eidson ............. H04B 7/0669
370/203

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

(Continued)

*Primary Examiner* — Dac Ha
(74) *Attorney, Agent, or Firm* — Shichrur & Co.

(57) ABSTRACT

Some demonstrative embodiments include apparatuses, devices, systems and methods of communicating a Single Carrier (SC) Space Time Block Coding (STBC) transmission. For example, a station may generate a plurality of space-time streams including at least a first space-time stream and a second space-time stream, the first space-time stream including, in a first interval, a first data sequence followed by a first Guard Interval (GI) sequence, the second space-time stream including, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream including, in the second interval, a time-inverted complex conjugate of the first data sequence followed by the second GI sequence; and transmit a SC STBC transmission based on the plurality of space-time streams.

23 Claims, 8 Drawing Sheets

(56) References Cited

U.S. PATENT DOCUMENTS

| | | | |
|---|---|---|---|
| 2005/0254596 A1 | 11/2005 | Naguib | |
| 2008/0080613 A1 | 4/2008 | Garth et al. | |
| 2008/0279301 A1* | 11/2008 | Khan | H04B 7/0669 375/267 |
| 2009/0028258 A1* | 1/2009 | Ma | H04L 27/2602 375/260 |
| 2010/0091903 A1 | 4/2010 | Castelain et al. | |
| 2010/0091904 A1 | 4/2010 | Wang et al. | |
| 2010/0226415 A1* | 9/2010 | Mehta | H04L 1/0625 375/219 |
| 2015/0071372 A1* | 3/2015 | Zhang | H04L 27/2602 375/295 |
| 2015/0311962 A1 | 10/2015 | Maltsev et al. | |
| 2015/0365908 A1* | 12/2015 | Maltsev | H04W 52/267 455/522 |
| 2017/0048095 A1* | 2/2017 | Sun | H04L 27/2692 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Siavash M. Alamouti, "A Simple Transmit Diversity Technique for Wireless Communications", IEEE Journal on Select Areas in Communications, vol. 16, No. 8, Oct. 1998, pp. 1451-1458, 8 pages.

International Search Report and Written Opinion for PCT/US20171038257, dated Sep. 21, 2017, 16 pages.

\* cited by examiner

APPARATUS, SYSTEM AND METHOD OF COMMUNICATING A SINGLE CARRIER (SC) SPACE TIME BLOCK CODE (STBC) TRANSMISSION

CROSS REFERENCE

This Application claims the benefit of and priority from U.S. Provisional Patent Application No. 62/364,420 entitled "Apparatus, System and Method of communicating according to a transmit diversity scheme", filed Jul. 20, 2016, the entire disclosure of which is incorporated herein by reference.

TECHNICAL FIELD

Embodiments described herein generally relate to communicating a Single Carrier (SC) Space Time Block Code (STBC) transmission.

BACKGROUND

A wireless communication network in a millimeter-wave (mmWave) band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
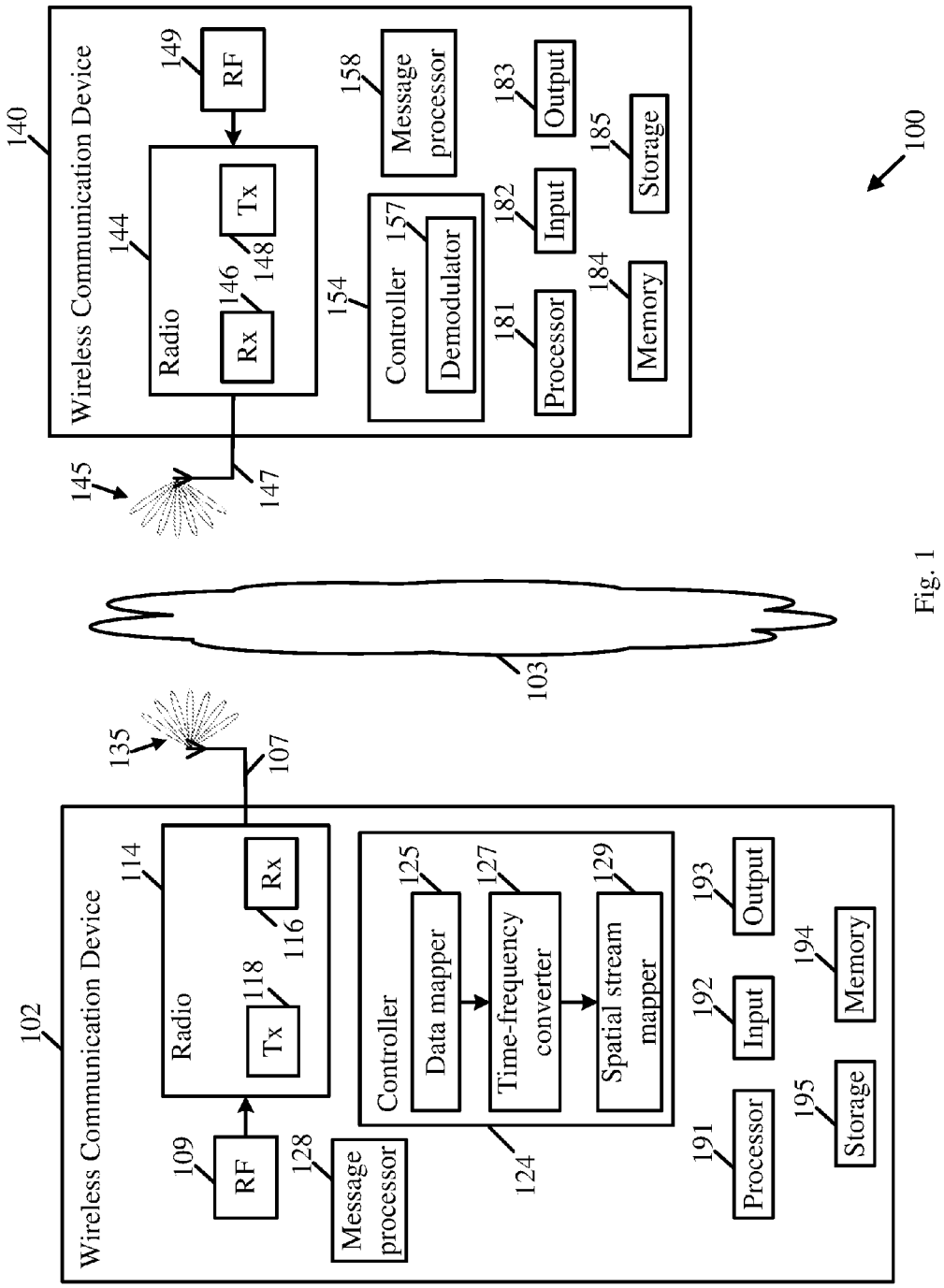
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems—Local and Metropolitan Area Networks Specific Requirements—Part 11:*

Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology Telecommunications and Information Exchange Between Systems—Local and Metropolitan Area Networks—Specific Requirements—Part 11: Wireless LAN Medium Access Control (MAC) and Physical Layer (PHY) Specifications Amendment 3: Enhancements for Very High Throughput in the 60 GHz Band", 28 Dec. 2012); IEEE-802.11REVmc ("IEEE 802.11-REVmc™/D6.0, June 2016, draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number of rows, and an integer number of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including, one or more *IEEE* 802.11 *Specifications*, e.g., an *IEEE* 802.11*ad Specification*, an *IEEE* 802.11*REVmc Specification*, an *IEEE* 802.11*ay Specification*, and/or any other specification and/or protocol.

Some demonstrative embodiments may be implemented, for example, as part of a new standard in an mmWave band, e.g., a 60 GHz frequency band or any other directional band, for example, as an evolution of an *IEEE* 802.11*ad Specification*.

In some demonstrative embodiments, devices 102 and/or 140 may be configured according to one or more standards, for example, in accordance with an *IEEE* 802.11*ay Standard*, which may be, for example, configured to enhance the efficiency and/or performance of an *IEEE* 802.11*ad Specification*, which may be configured to provide Wi-Fi connectivity in a 60 GHz band.

Some demonstrative embodiments may enable, for example, to significantly increase the data transmission rates defined in the *IEEE* 802.11*ad Specification*, for example, from 7 Gigabit per second (Gbps), e.g., up to 30 Gbps or more, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an *IEEE* 802.11*ay Standard* and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

Some wireless communication specifications, for example, the *IEEE 802.11ad-2012 Specification*, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices. For example, device 102 may be configured to transmit a MIMO transmission to one or more devices, e.g., including device 140. In one example, device 102 may transmit a MU-MIMO transmission to a plurality of devices, e.g., including device 140.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

In some demonstrative embodiments, a MU DL MIMO transmission may include a DL transmission from a station, e.g., device 102, to a plurality of stations, e.g., a plurality of stations including device 140, for example, at least partially simultaneously.

In some demonstrative embodiments, a MU UL MIMO transmission may include an UL transmission from a plurality of stations, e.g., including device 140, to a station, e.g., device 102, for example, at least partially simultaneously.

In some demonstrative embodiments, devices 102 and/or 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In some demonstrative embodiments, devices 102 and/or 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, e.g., according to a channel bonding factor of two, a channel BW of 6.48 GHz, e.g., according to a channel bonding factor of four, and/or any other additional or alternative channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC) schemes utilizing a space-time channel diversity property may be implemented to achieve one or more enhancements for the MIMO transmission.

In some demonstrative embodiments, STBC schemes may be defined, for example, based on an Alamouti diversity technique, e.g., as described by Siavash M. Alamouti, "*A Simple Transmit Diversity Technique for Wireless Communications,*" *IEEE Journal on Selected Areas in Communications*, vol. 16, no. 8, October 1998. The Alamouti diversity technique may provide, for example, a diversity gain equal to a gain achieved by a Maximum Ratio Combining (MRC) approach. For example, the Alamouti diversity technique may include transmission using two antennas and reception using an arbitrary number of antennas, denoted $N_{R_x}$.

For example, STBC schemes based on the Alamouti technique may be defined, e.g., in accordance with one or more *IEEE 802.11 Specifications*, e.g., one or more *IEEE 802.11n* and/or *IEEE 802.11.ac Specifications*. For example, an STBC approach according to the *IEEE 802.11n* and/or *IEEE 802.11.ac Specifications* may reuse the $2 \times N_{R_x}$ Alamouti approach to define an STBC with a required number of transmit antennas from an OFDM implementation.

In some demonstrative embodiments, devices 102 and/or 140 may be configured to generate, transmit, receive and/or process a transmission according to a symbol blocking scheme, e.g., as described below.

In some demonstrative embodiments, the symbol blocking scheme may be configured to support an STBC of a space time diversity scheme, for example, an Alamouti space-time diversity scheme, for a SC PHY, for example, to be implemented by a future *IEEE 802.11ay Specification*.

In some demonstrative embodiments, the symbol blocking scheme may be configured to allow, for example, maintaining a blocking structure per space-stream, for example, in compliance with a legacy Specification for SISO transmission, e.g., an *IEEE 802.11ad Specification*.

In some demonstrative embodiments, a space-time diversity scheme, e.g., an Alamouti block coding, may be applied for a data part, e.g., only for the data part, for example, without affecting a Guard Interval (GI) transmission. For example, known GIs may be implemented to allow using the known GIs as pilot sequences, e.g., for different types of estimations and/or phase tracking at the receiver.

In some demonstrative embodiments, implementation of an STBC scheme to a SC transmission, e.g., a SC STBC transmission, may not be straightforward, e.g., as described below.

Figure 2:
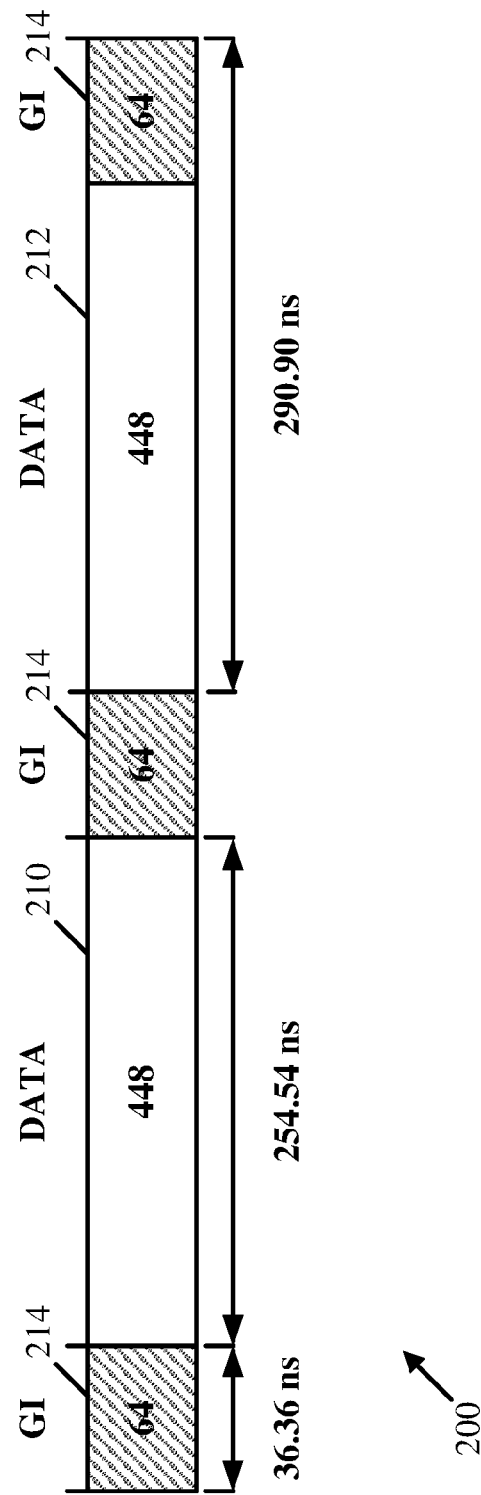
FIG. 2 is a schematic illustration of a symbol block structure, which may be implemented for communication over a directional band, e.g., in accordance with some demonstrative embodiments.

Reference is made to FIG. 2, which schematically illustrates a symbol block structure 200, which may be implemented in accordance with some demonstrative embodiments. For example, symbol block structure 200 may be implemented for communication over a directional band, e.g., in compliance with, and/or in compatibility with, an *IEEE 802.11ad Specification*. Symbol block structure 200 depicts the structure of two SC symbol blocks.

In some demonstrative embodiments, as shown in FIG. 2, symbol block structure 200 may include a symbol blocking structure in a time domain, for example, in which the input flow of a mapper of constellation points is divided into blocks, e.g., blocks 210, and 212, of a length 448 chips (or samples).

For example, as shown in FIG. 2, data block 210 and data block 212 may be prepended with a Guard Interval (GI) 214 of 64 chips (or samples). For example, data block 210 and data block 208 may be prepended with GI 214.

In some demonstrative embodiments, GI 214 may be defined, for example, based on a $Ga_{64}$ Golay sequence, for example, based on a product of the $Ga_{64}$ Golay sequence multiplied by the exponent $exp(j\pi/2*n)$, where n=0, 1, . . . , 63 is a chip time index.

In some demonstrative embodiments, as shown in FIG. 2, an extra GI 214 repetition may be appended at the very end of the chain of SC symbol blocks.

In one example, the introduction of GI 214 to the SC block structure 200 may, for example, create a cyclic prefix, which may allow implementing SC demodulation with frequency domain equalization.

In another example, the introduction of GI 214 to the SC block structure 200 may enable a receiver of a transmission to use the known $Ga_{64}$ sequence, for example, as a pilot sequence, e.g., for different types of estimations and tracking.

In some demonstrative embodiments, the Golay $Ga_{64}$ sequence may be determined, defined, and/or generated, for example, according to one or more parameters, for example, a delay vector, denoted Dk, and/or a weight vector, denoted Wk, e.g., as described below.

In some demonstrative embodiments, the $Ga_{64}$ sequence may be generated, for example, using a Golay sequence generator having a structure, e.g., in accordance with an *IEEE 802.11ad Specification* and/or any other Specification. One or more parameters of the Golay generator, for example, the delay vector, denoted Dk, and/or the weight vector, denoted Wk, may be defined differently. The pair of vectors (Dk, Wk) may, for example, fully define the output sequence $Ga_{64}$.

In one example, the $Ga_{64}$ sequence may be defined based on the following Dk and Wk vectors:
1. Delay vector: Dk=[2 1 4 8 16 32];
2. Weight vector: Wk=[+1,+1,−1,−1,+1,−1].

Referring back to FIG. 1, in some demonstrative embodiments, devices 102 and/or 140 may be configured to communicate a SC transmission, e.g., a SC STBC transmission, for example, according to a SC Symbol Blocking scheme configured for STBC over two or more Space-Time Streams, e.g., as described below.

In some demonstrative embodiments, devices 102 and/or 140 may be configured to communicate according to an STBC scheme, which may be configured to apply a coding to a data part of a transmission, e.g., only to the data part, for example, without applying a coding to the GI portion.

In some demonstrative embodiments, devices 102 and/or 140 may be configured to communicate according to the STBC scheme, which may be configured to apply the coding to a data part of a transmission, for example, utilizing a SC symbol blocking structure, e.g., in compliance with an *IEEE 802.11ad Specification*.

In some demonstrative embodiments, devices 102 and/or 140 may be configured to communicate the SC transmission according to a SC block structure, which may be configured for SC PHY modulation, for example, to support the STBC scheme, e.g., as described below.

In some demonstrative embodiments, the SC block structure may be configured, for example, to include data in a sequence of time intervals of a plurality of space-time streams, e.g., as described below.

In some demonstrative embodiments, controller 124 may be configured to cause, trigger, and/or control a wireless station implemented by device 102 to generate and transmit the SC transmission, e.g., the SC STBC transmission, to at least one other station, for example, a station implemented by device 140, e.g., as described below.

In some demonstrative embodiments, controller 124 may be configured to cause, trigger, and/or control the wireless station implemented by device 102 to generate and transmit the SC transmission according to the STBC scheme, e.g., as described below.

In some demonstrative embodiments, controller 124 may be configured to cause, trigger, and/or control the wireless station implemented by device 102 to generate a plurality of space-time streams based on data to be transmitted, which may be represented by a plurality of data samples, e.g., as described below.

In some demonstrative embodiments, controller 124 may include, operate as, and/or perform the functionality of a data mapper 125, which may be configured to generate the plurality of space-time streams, for example, based on data samples of the data to be transmitted, e.g., as described below.

In some demonstrative embodiments, data mapper 125 may be configured to map the data samples to the plurality of space-time streams according to a frame structure, which may be configured to support the STBC scheme, e.g., as described below.

In some demonstrative embodiments, data mapper 125 may be configured to map the data samples to a plurality of intervals in the plurality of space-time streams, e.g., as described below.

In some demonstrative embodiments, the plurality of space-time streams may include at least two space-time streams, for example, to support the SC STBC transmission, e.g., as described below.

In some demonstrative embodiments, data mapper 125 may be configured to generate the plurality of space-time streams according to a Guard Interval (GI) frame structure including one or more GI sequences, e.g., as described below.

In some demonstrative embodiments, data mapper 125 may be configured to map the one or more GI sequences to the plurality of space-time streams, for example, based on the STBC scheme, e.g., as described below.

In some demonstrative embodiments, the plurality of space-time streams may include at least a first space-time stream and a second space-time stream, e.g., as described below.

In some demonstrative embodiments, data mapper 125 may generate and insert into the first and second space-time streams first and second GI sequences for the first and second space-time streams, respectively, e.g., according to the STBC scheme, e.g., as described below.

In some demonstrative embodiments, data mapper 125 may be configured to generate at least the first space-time stream including, in a first interval, a first data sequence followed by the first GI sequence; and the second space-time stream including, in the first interval, a second data sequence followed by the second GI sequence, e.g., as described below.

In some demonstrative embodiments, data mapper 125 may be configured to generate the first space-time stream including, in a second interval subsequent to the first interval, a sign-inverted and time-inverted complex conjugate of the second data sequence followed by the first GI sequence; and the second space-time stream including, in the second interval, a time-inverted complex conjugate of the first data sequence followed by the second GI sequence, e.g., as described below.

In some demonstrative embodiments, data mapper 125 may be configured to generate the plurality of space-time streams, for example, by mapping the first and second data sequences to the first interval of the first and second space-time streams; and by mapping an encoded repetition of the first and second data sequences to the second interval of the first and second space-time streams, e.g., subsequent to the first interval, as described below.

For example, according to the STBC scheme, the first and second data sequences may include two blocks, denoted $x_{N-M}$ and $y_{N-M}$, for example, each having a length of N-M chips (or samples), e.g., as described below.

In some demonstrative embodiments, N may be an integer equal to 512, and M may be an integer equal to 32, 64 or 128. In other embodiments, N and/or M may have any other value.

In some demonstrative embodiments, the first space-time stream may include, in the first interval, the first data sequence followed by a first GI sequence; and the second space-time stream may include, in the first interval, the second data sequence followed by a second GI sequence, e.g., as described below.

In some demonstrative embodiments, the first space-time stream may include, in the second interval, the encoded repetition of the second space-time stream followed by the first GI sequence; and the second space-time stream may include, in the second interval, the encoded repetition of the first data sequence followed by the second GI sequence, e.g., as described below.

In some demonstrative embodiments, the encoded repetition of the first and second data sequences may be based on an encoding of the STBC scheme to be applied for the SC STBC transmission, e.g., the STBC scheme, and/or any other time-space diversity scheme.

In some demonstrative embodiments, the encoded repetition of the first data sequence may include a time-inverted complex conjugate of the first data sequence corresponding to the block $x_{N-M}$, and/or the encoded repetition of the second data sequence may include a sign-inverted and time-inverted complex conjugate of the second data sequence corresponding to the block $y_{N-M}$, e.g., as described below.

In some demonstrative embodiments, data mapper 125 may map two blocks of the SC block structure to the first space-time stream, for example, according to an STBC symbol blocking mapping, for example, as $(x_{N-M}(n), -y^*_{N-M}(-n))$, wherein * denotes complex conjugation, and wherein an indexing (-n) denotes reverse chips (or samples) order in time.

In some demonstrative embodiments, data mapper 125 may map the two blocks of the SC block structure to the second space-time stream, for example, according to the STBC symbol blocking mapping, for example, as $(y_{N-M}(n), x^*_{N-M}(-n))$.

In some demonstrative embodiments, data mapper 125 may be configured to map the first GI sequence, e.g., a GI sequence $g_{1,M}(n)$, to the first interval and the second interval in the first space-time stream, for example, by inserting the first GI sequence following data sequences of the first space-time stream, for example, following the data sequences corresponding to the blocks $(x_{N-M}(n), -y^*_{N-M}(-n))$, e.g., as described below.

In some demonstrative embodiments, data mapper 125 may be configured to map the second GI sequence, e.g., a GI sequence $g_{2,M}(n)$, to the first interval and the second interval in the second space-time stream, for example, by inserting the second GI sequence following data sequences of the second space-time stream, for example, following the data sequences corresponding to the blocks $(y_{N-M}(n), x^*_{N-M}(-n))$, e.g., as described below.

In some demonstrative embodiments, the first GI sequence and the second GI sequence may have a same length.

In some demonstrative embodiments, the first and second GI sequences may include different sequences, e.g., each having a length of M chips (or samples).

In some demonstrative embodiments, each of the first and second GI sequences may have a length of 32 samples or 64 samples. In other embodiments, each of the first and second GI sequences may have a length of 128 samples, or any other length.

In other embodiments, the first and/or second GI sequences may include any other sequences of any other similar or different lengths.

In some demonstrative embodiments, each of the first and second GI sequences may include a Golay sequence, for example, a Golay sequence $Ga_{32}$, a Golay sequence $Ga_{64}$, or any other Golay sequence. In other embodiments, each of the first and second GI sequences may include any other Golay or non-Golay sequence.

In some demonstrative embodiments, controller 124 may include, operate as, and/or perform the functionality of a time-frequency converter 127, which may be configured to convert the plurality of space-time streams into a respective plurality of frequency-domain streams in a frequency domain, e.g., as described below.

In some demonstrative embodiments, time-frequency converter 127 may be configured to convert the plurality of space-time streams into the plurality of frequency-domain streams, for example, by applying a time-frequency conversion function to the plurality of space-time streams.

In some demonstrative embodiments, time-frequency converter 127 may be configured to convert the plurality of space-time streams into the plurality of frequency-domain streams, for example, by applying a Discrete Fourier Transform (DFT), e.g., as described below. In other embodiments, any other time-frequency conversion function may be used.

In some demonstrative embodiments, the first and second intervals, which may be used by data mapper 125 to map the first and second data sequences, may be based on the time-frequency conversion function implemented by time-frequency converter 127.

In some demonstrative embodiments, the first and second intervals may include first and second DFT intervals, e.g., first and second subsequent DFT intervals.

In some demonstrative embodiments, the first and second intervals may each have a size, e.g., N, of the DFT ("DFT size") to be applied by time-frequency converter 127.

In other embodiments, the first and second intervals may have any other size and/or may include any other intervals, e.g., based on the size and/or type of the time-frequency conversion function.

In some demonstrative embodiments, controller 124 may include, operate as, and/or perform the functionality of a spatial stream mapper 129, which may be configured to map the plurality of frequency-domain streams to a plurality of frequency domain spatial streams to be transmitted as part of the SC STBC transmission, e.g., as described below.

In some demonstrative embodiments, spatial stream mapper 129 may be configured to map the plurality of frequency-domain streams to the plurality of frequency domain spatial streams according to the STBC scheme, e.g., as described below.

In some demonstrative embodiments, controller 124 may be configured to cause, trigger, and/or control the wireless station implemented by device 102 to transmit the SC STBC transmission based on the plurality of frequency domain streams, for example, as mapped by spatial stream mapper 129 to the plurality of spatial streams, e.g., as described below.

In some demonstrative embodiments, the SC STBC transmission may include a $N_T \times N_R$ SC STBC transmission, e.g., as described below. For example, $N_T$ may be an integer equal to or greater than 2, and $N_R$ may be an integer equal to or greater than 1.

In some demonstrative embodiments, the SC STBC transmission may include a SC MIMO transmission.

In some demonstrative embodiments, controller 124 may be configured to cause, trigger, and/or control the wireless station implemented by device 102 to transmit the SC STBC transmission over a directional frequency band, for example, a DMG band, or any other band.

In some demonstrative embodiments, controller 124 may be configured to cause, trigger, and/or control the wireless station implemented by device 102 to transmit the plurality of spatial streams via a plurality of antennas, e.g., including a plurality of directional antennas.

In some demonstrative embodiments, controller 124 may be configured to cause, trigger, and/or control the wireless station implemented by device 102 to transmit the first spatial stream via a first antenna of antennas 107, and to transmit the second spatial stream via a second antenna of antennas 107.

In some demonstrative embodiments, controller 124 may be configured to cause, trigger, and/or control the wireless station implemented by device 102 to generate and transmit the first space-time stream including, in the first interval, the first data sequence, for example, the data sequence corresponding to the block $x_{N-M}$, followed by the first GI sequence, for example, $g_{1,M}(n)$; and the second space-time stream including, in the first interval, the second data sequence, for example, the data sequence corresponding to the block $y_{N-M}$, followed by the second GI sequence, for example, $g_{2,M}(n)$, e.g., e.g., as described below.

In some demonstrative embodiments, controller 124 may be configured to cause, trigger, and/or control the wireless station implemented by device 102 to generate and transmit the first space-time stream including, in the second interval subsequent to the first interval, a sign-inverted and time-inverted complex conjugate of the second data sequence, e.g., a sign-inverted and time-inverted complex conjugate of the data sequence corresponding to the block $y_{N-M}$, followed by the first GI sequence, for example, $g_{1,M}(n)$; and the second space-time stream including, in the second interval, a time-inverted complex conjugate of the first data sequence, e.g., a time-inverted complex conjugate of the data sequence corresponding to the block $x_{N-M}$, followed by the second GI sequence, for example, $g_{2,M}(n)$, e.g., as described below.

Figure 3:
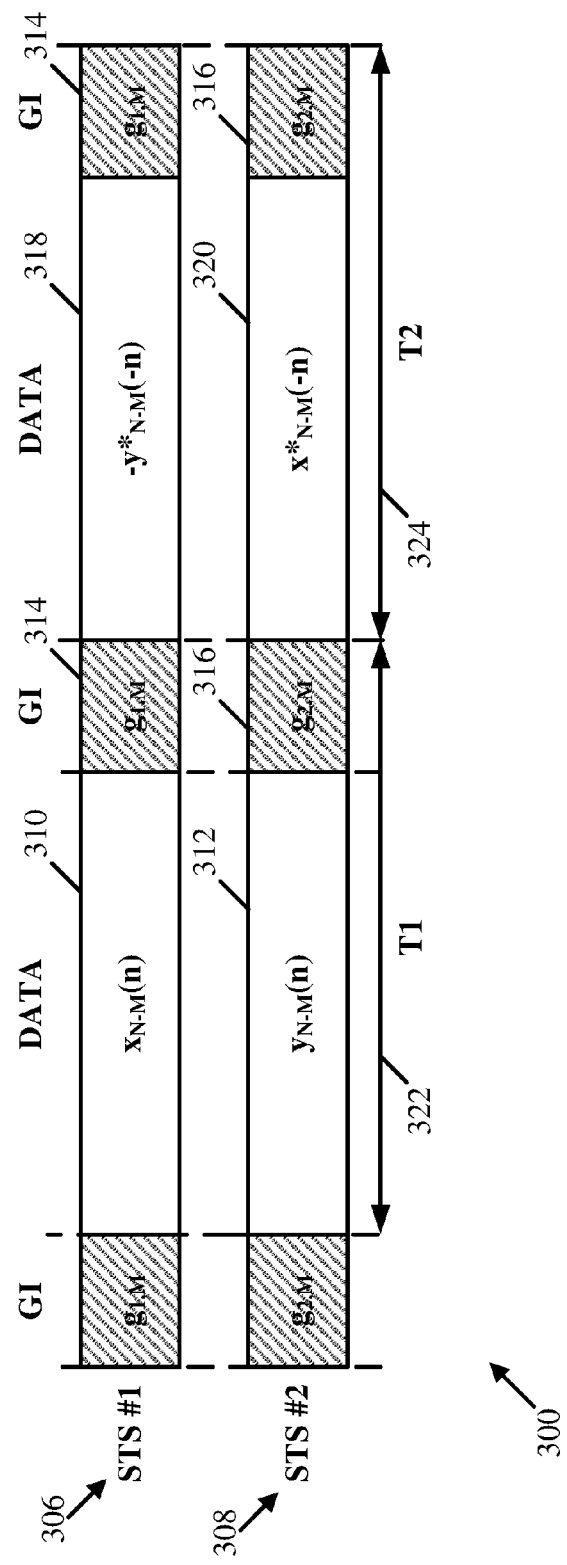
FIG. 3 is a schematic illustration of a Single Carrier (SC) block structure for a Space Time Block Code (STBC) with two space-time streams, in accordance with some demonstrative embodiments.

Reference is made to FIG. 3, which schematically illustrates a SC block structure 300, in accordance with some demonstrative embodiments. For example, data mapper 125 (FIG. 1) may be configured to map data sequences to a plurality of space-time streams according to SC block structure 300 of FIG. 3.

In some demonstrative embodiments, SC block structure 300 may include a SC symbol blocking scheme for an STBC with two space-time streams, in accordance with some demonstrative embodiments. The symbol block structure of FIG. 3 depicts the structure of two SC symbol blocks.

In some demonstrative embodiments, SC block structure 300 of FIG. 3 may be configured to support a $N_T \times N_R$ SC STBC transmission, for example, which may be implemented in accordance with a future *IEEE 802.11ay Standard*, and/or any other protocol, Standard and/or Specification.

In some demonstrative embodiments, SC block structure 300 may include a first space-time stream 306, and a second space-time stream 308, e.g., as described below.

In some demonstrative embodiments, as shown in FIG. 3, SC block structure 300 may be configured to map two data sequences to two consecutive intervals, e.g., a first interval 322 and a second interval 324 subsequent to first interval 322, in first space-time stream 306 and second space-time stream 308.

In some demonstrative embodiments, first interval 322 may include a first DFT interval, and second interval 324 may include a second DFT interval, for example, according to a size of a DFT interval of a DFT to be applied to SC block structure 300, e.g., by time-frequency converter 127 (FIG. 1).

In some demonstrative embodiments, first space-time stream 306 and second space-time stream 308 may be configured to be converted, e.g., by time-frequency converter 127 (FIG. 1), into respective frequency-domain streams in a frequency domain, and mapped, e.g., by spatial stream mapper 129 (FIG. 1), to first and second frequency domain spatial streams, according to a STBC scheme.

In some demonstrative embodiments, data mapped to first interval 322 of space-time streams 306 and 308 may be transmitted in a first SC symbol transmission at a first time, e.g., at the time T; and data mapped to second interval 324 of space-time streams 306 and 308 may be transmitted in a second SC symbol transmission at a second time, e.g., at the time T+t, subsequent to the first time, e.g., as described below.

In some demonstrative embodiments, as shown in FIG. 3, SC block structure 300 may be configured to map to first interval 322 a first data sequence, e.g., a data sequence $x_{N-M}(n)$, and a second data sequence, e.g., a data sequence $y_{N-M}(n)$, to be transmitted, for example, in a single SC symbol having a size of (N−M) samples.

For example, the data sequence $x_{N-M}(n)$ may include (N−M) samples, e.g., $x_{N-M}=[x_1, x_2, \ldots, x_{N-2-1}, x_{N-M}]$; and/or the data sequence $y_{N-M}(n)$ may include (N−M) samples, e.g., $y_{N-M}=[y_1, y_2, \ldots, y_{N-M-1}, y_{N-M}]$. For example, N may denote the DFT size, for example, of a DFT to be applied to SC block structure 300, e.g., by time-frequency converter 127 (FIG. 1).

In some demonstrative embodiments, according to SC block structure 300, first interval 322 in first space-time stream 306 may include a first data sequence 310 including the data sequence $x_{N-M}(n)$, and first interval 322 in second space-time stream 308 may include a second data sequence 312 including the data sequence $y_{N-M}(n)$.

In some demonstrative embodiments, according to SC block structure 300, first data sequence 310, e.g., the data sequence $x_{N-M}(n)$, may be repeated with encoding in second interval 324 of second space-time stream 308, e.g., to be transmitted in a subsequent SC symbol transmission. For example, second interval 324 of the second space-time stream 308 may include a time inversion and complex conjugation 320 of first data sequence 310. For example, as shown in FIG. 3, the subsequent SC symbol corresponding to second interval 324 in second space-time stream 308 may include the sequence $x_{N-M}(-n)^* = [x_{N-M}^*, x_{N-M-1}^*, \ldots, x_2^*, x_1^*]$.

In some demonstrative embodiments, according to SC block structure 300, second data sequence 312, e.g., the data sequence $y_{N-M}(n)$, may be repeated with encoding in second interval 324 of first space-time stream 306, e.g., to be transmitted in the subsequent SC symbol transmission. For example, second interval 324 of first space-time stream 306 may include a time inversion, complex conjugation and sign inversion 318 of second data sequence 312. For example, as shown in FIG. 3, the subsequent SC symbol corresponding to second interval 324 in first space-time stream 306 may include the sequence $-y_{N-M}(-n)^* = [-y_{N-M}^*, -y_{N-M-1}^*, \ldots, -y_2^*, -y_1^*]$.

In some demonstrative embodiments, according to SC block structure 300, GI sequences may be mapped to first interval 322 and second interval 324 of space-time stream 306, and to first interval 322 and second interval 324 of space-time stream 308, e.g., as described below.

In one example, the GI sequences may include a Golay sequence with a size of M, e.g., based on the Golay sequence $Ga_{32}$, the Golay sequence $Ga_{64}$, or any other Golay sequence. In another example, the GI sequences may include any other Golay or non-Golay sequence.

In some demonstrative embodiments, according to SC block structure 300, first interval 322 and second interval 324 of first space-time stream 306 may include a first GI sequence 314, e.g., denoted $g_{1,M}(n)$, following first data sequence 310, and encoded repetition 318.

In some demonstrative embodiments, first GI sequence 314 may include a GI complex sequence of M samples, wherein the index $n=1 \ldots M$, e.g., $g_{1,M}(n)=[g_{1,1}, g_{1,2}, \ldots, g_{1,M-1}, g_{1,M}]$.

In some demonstrative embodiments, according to SC block structure 300, first interval 322 and second interval 324 of second space-time stream 308 may include a second GI sequence 316, e.g., denoted $g_{2,M}(n)$, following second data sequence 312, and encoded repetition 320.

In some demonstrative embodiments, second GI sequence 316 may include a GI complex sequence of M samples, wherein the index $n=1 \ldots M$, e.g., $g_{2,M}(n)=[g_{2,1}, g_{2,2}, \ldots, g_{2,M-1}, g_{2,M}]$.

In some demonstrative embodiments, the definition of the two different sequences $g_{1,M}$ and $g_{2,M}$ as GIs in the space-time streams may allow, for example, a technical advantage of avoiding coherent signal transmission, and, as a result, avoiding unintentional beamforming.

In some demonstrative embodiments, the GI sequences $g_{1,M}$ and $g_{2,M}$ may include any suitable sequences, for example, Golay sequences, orthogonal sequences, and/or any other additional or alternative sequences.

In some demonstrative embodiments, the symbol structure shown in FIG. 3 may be, for example, repeated for one or more additional subsequent SC symbols, e.g., for one or more subsequent pairs of SC symbols.

In some demonstrative embodiments, two subsequent SC data blocks, e.g., the data blocks (x, y), may be mapped to two subsequent SC symbols, for example, while maintaining the same coding, e.g., the Alamouti-based space-time block coding. Accordingly, two data blocks of the SC block structure may be transmitted using two SC symbols or two time intervals, e.g., DFT intervals, for example, the first interval 322, and the second interval 324.

Referring back to FIG. 1, in some demonstrative embodiments, devices 102 and/or 140 may be configured to communicate a SC transmission, e.g., a SC STBC transmission, for example, according to a SC Symbol Blocking scheme configured for STBC over more than two Space-Time Streams, e.g., as described below.

In some demonstrative embodiments, the STBC blocking structure described above with respect to two space-time streams may be generalized to more than two space-time streams, e.g., as described below.

In some demonstrative embodiments, the STBC blocking structure may be configured for an even number of space-time streams, e.g., as described below.

Some demonstrative embodiments are described below with respect to the STBC blocking structure configured for four space-time streams. In other embodiments, the STBC blocking structure may be configured for any other number of space-time streams.

In some demonstrative embodiments, data mapper 125 may be configured to generate at least a first space-time stream, a second space-time stream, a third space-time stream, and a fourth space-time stream, e.g., as described below.

In some demonstrative embodiments, the first space-time stream may include first space-time stream 306 (FIG. 3), and the second space-time stream may include second space-time stream 308 (FIG. 3).

In some demonstrative embodiments, a third space-time stream may include, in a first interval, a third data sequence followed by a third GI sequence, and/or the fourth space-time stream may include, in the first interval, a fourth data sequence followed by a fourth GI sequence, e.g., as described below.

In some demonstrative embodiments, the third space time stream may include, in the second interval, a sign-inverted and time-inverted complex conjugate of the fourth data sequence followed by the third GI sequence, and/or the fourth stream may include, in the second interval, a time-inverted complex conjugate of the third data sequence followed by the fourth GI sequence, e.g., as described below.

Figure 4:
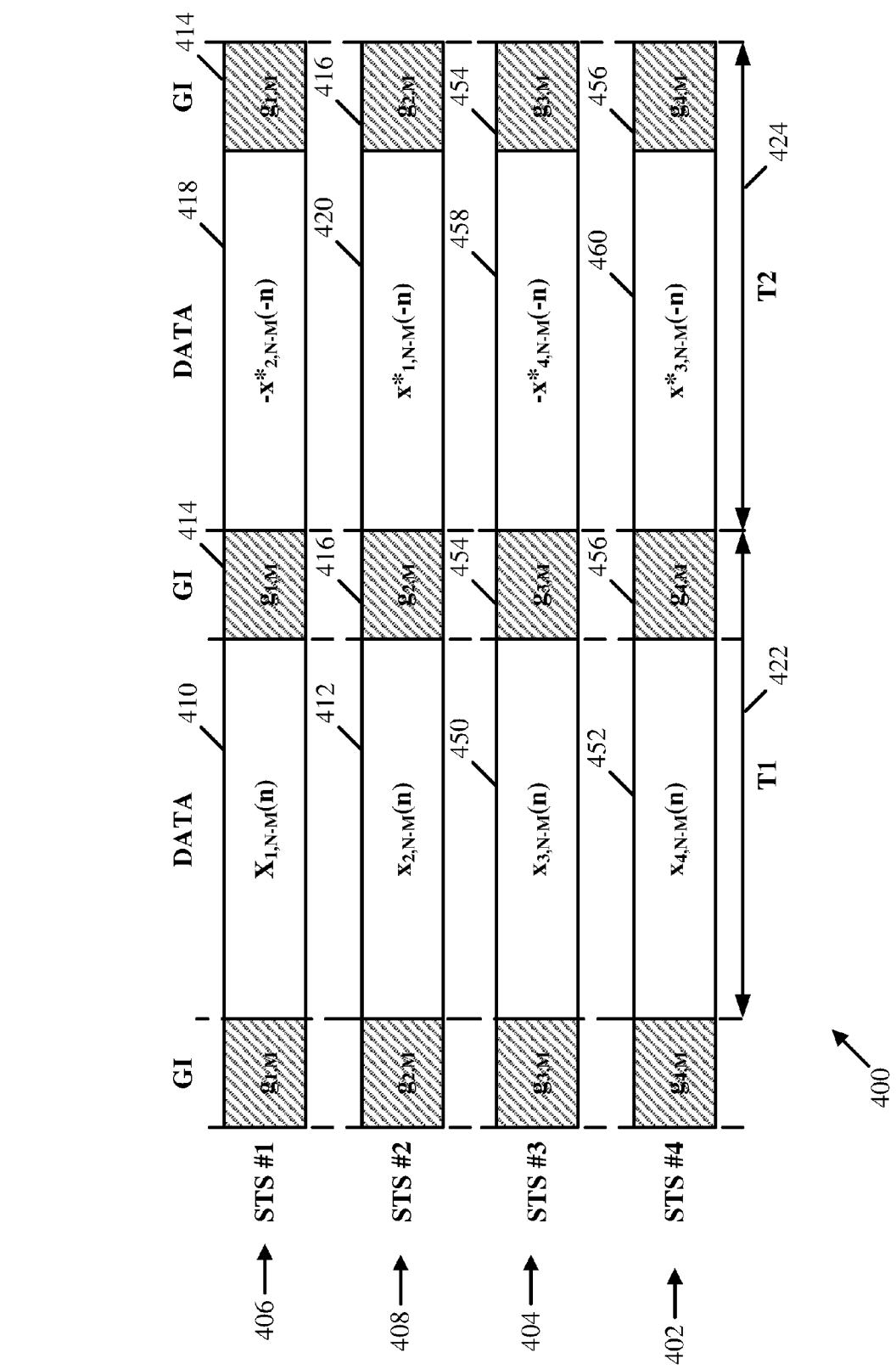
FIG. 4 is a schematic illustration of a SC block structure for an STBC with four space-time streams, in accordance with some demonstrative embodiments.

Reference is made to FIG. 4, which schematically illustrates a SC block structure 400, in accordance with some demonstrative embodiments. For example, data mapper 125 (FIG. 1) may be configured to map data sequences to a plurality of space-time streams according to the SC block structure of FIG. 4.

In some demonstrative embodiments, SC block structure 400 may include a SC symbol blocking scheme for an STBC with four space-time streams, in accordance with some demonstrative embodiments.

In some demonstrative embodiments, SC block structure 400 may include a first space-time stream 406, a second space-time stream 408, a third space-time stream 404, and a fourth space-time stream 402, e.g., as described below.

In some demonstrative embodiments, as shown in FIG. 4, SC block structure 400 may be configured to map four data sequences to two consecutive intervals, e.g., a first interval 422 and a second interval 424 subsequent to first interval 422, in first space-time stream 406, second space-time stream 408, third space-time stream 404, and fourth space-time stream 402.

In some demonstrative embodiments, first space-time stream 406, second space-time stream 408, third space-time stream 404, and fourth space-time stream 402 may be configured to be converted, e.g., by time-frequency converter 127 (FIG. 1), into respective frequency-domain streams in a frequency domain, and mapped, e.g., by spatial stream mapper 129 (FIG. 1), to first, second, third, and fourth frequency domain spatial streams, according to the STBC scheme.

In some demonstrative embodiments, for example, for four space-time streams, four blocks of input data, denoted $x_{1,N-M}$, $x_{2,N-M}$, $x_{3,N-M}$, and $x_{4,N-M}$, may be mapped to four space-time streams, e.g., as described below.

In some demonstrative embodiments, as shown in FIG. 4, SC block structure 400 may be configured to map to first interval 422 a first data sequence, e.g., the data sequence $x_{1,N-M}(n)$, a second data sequence, e.g., the data sequence $x_{2,N-M}(n)$, a third data sequence, e.g., the data sequence $x_{3,N-M}(n)$, and a fourth data sequence, e.g., the data sequence $x_{4,N-M}(n)$, to be transmitted, for example, in a single SC symbol having a size of (N–M) samples, e.g., over four spatial streams.

In some demonstrative embodiments, according to SC block structure 400, first interval 422 in first space-time stream 406 may include a first data sequence 410 including the data sequence $x_{1,N-M}(n)$, and first interval 422 in second space-time stream 408 may include a second data sequence 412 including the data sequence $x_{2,N-M}(n)$.

In some demonstrative embodiments, according to SC block structure 400, first interval 422 in third space-time stream 404 may include a third data sequence 450 including the data sequence $x_{3,N-M}(n)$, and first interval 422 in fourth space-time stream 402 may include a fourth data sequence 452 including the data sequence $x_{4,N-M}(n)$.

In some demonstrative embodiments, according to SC block structure 400, first data sequence 410, e.g., $x_{1,N-M}(n)$, may be repeated with encoding in second interval 424 of second space-time stream 408, e.g., to be transmitted in a subsequent SC symbol transmission. For example, second interval 424 of second space-time stream 408 may include a time inversion and complex conjugation 420 of first data sequence 410. For example, as shown in FIG. 4, the subsequent SC symbol corresponding to second interval 424 in second space-time stream 408 may include the sequence $x^*_{1,N-M}(-n)=[x_{1,N-M}^*, x_{1,N-M-1}^*, \ldots, x_{1,2}^*, x_{1,1}^*]$.

In some demonstrative embodiments, according to SC block structure 400, second data sequence 412, e.g., $x_{2,N-M}(n)$, may be repeated with encoding in second interval 424 of first space-time stream 406, e.g., to be transmitted in the subsequent SC symbol transmission. For example, second interval 424 of first space-time stream 406 may include a time inversion, complex conjugation and sign inversion 418 of second data sequence 412. For example, as shown in FIG. 4, the subsequent SC symbol corresponding to second interval 424 in first space-time stream 406 may include the sequence $-x^*_{2,N-M}(-n)=[-x_{2,N-M}^*, -x_{2,N-M-1}^*, \ldots, -x_{2,2}^*, -x_{2,1}^*]$.

In some demonstrative embodiments, according to SC block structure 400, third data sequence 450, e.g., $x_{3,N-M}(n)$, may be repeated with encoding in second interval 424 of fourth space-time stream 402, e.g., to be transmitted in the subsequent SC symbol transmission. For example, second interval 424 of fourth space-time stream 402 may include a time inversion and complex conjugation 460 of third data sequence 450. For example, as shown in FIG. 4, the subsequent SC symbol corresponding to second interval 424 in fourth space-time stream 402 may include the sequence $x^*_{3,N-M}(-n)=[x_{3,N-M}^*, x_{3,N-M-1}^*, \ldots, x_{3,2}^*, x_{3,1}^*]$.

In some demonstrative embodiments, according to SC block structure 400, fourth data sequence 452, e.g., $x_{4,N-M}(n)$, may be repeated with encoding in second interval 424 of third space-time stream 404, e.g., to be transmitted in the subsequent SC symbol transmission. For example, second interval 424 of third space-time stream 404 may include a time inversion, complex conjugation and sign inversion 458 of fourth data sequence 452. For example, as shown in FIG. 4, the subsequent SC symbol corresponding to second interval 424 in third space-time stream 404 may include the sequence $-x^*_{4,N-M}(-n)=[-x_{4,N-M}^*, -x_{4,N-M-1}^*, \ldots, -x_{4,2}^*, -x_{4,1}^*]$.

In some demonstrative embodiments, as shown in FIG. 4, four GI sequences, denoted $g_{1,M}$, $g_{2,M}$, $g_{3,M}$, $g_{4,M}$, may be defined for the four space-time streams, respectively. For example, the four GI sequences may include different sequences, e.g., to avoid unintentional beamforming. The GI sequences may include Golay sequences, orthogonal sequences and/or any other additional or alternative sequences.

In some demonstrative embodiments, according to SC block structure 400, first interval 422 and second interval 424 of first space-time stream 406 may include a first GI sequence 414, e.g., denoted $g_{1,M}(n)$, following first data sequence 410, and encoded repetition 418.

In some demonstrative embodiments, first GI sequence 414 may include a GI complex sequence of M samples, wherein the index n=1 . . . M, e.g., $g_{1,M}(n)=[g_{1,1}, g_{1,2}, \ldots, g_{1,M-1}, g_{1,M}]$.

In some demonstrative embodiments, according to SC block structure 400, first interval 422 and second interval 424 of second space-time stream 508 may include a second GI sequence 416, e.g., denoted $g_{2,M}(n)$, following first data sequence 412, and encoded repetition 420.

In some demonstrative embodiments, second GI sequence 416 may include a GI complex sequence of M samples, wherein the index n=1 . . . M, e.g., $g_{2,M}(n)=[g_{2,1}, g_{2,2}, \ldots, g_{2,M-1}, g_{2,M}]$.

In some demonstrative embodiments, according to SC block structure 400, first interval 422 and second interval 424 of third space-time stream 404 may include a third GI sequence 454, e.g., denoted $g_{3,M}(n)$, following third data sequence 450, and encoded repetition 458.

In some demonstrative embodiments, third GI sequence 454 may include a GI complex sequence of M samples, wherein the index n=1 . . . M, e.g., $g_{3,M}(n)=[g_{3,1}, g_{3,2}, \ldots, g_{3,M-1}, g_{3,M}]$.

In some demonstrative embodiments, according to SC block structure 400, first interval 422 and second interval 424 of fourth space-time stream 402 may include a fourth GI sequence 456, e.g., denoted $g_{4,M}(n)$, following fourth data sequence 452, and encoded repetition 460.

In some demonstrative embodiments, fourth GI sequence 456 may include a GI complex sequence of M samples, wherein the index n=1 . . . M, e.g., $g_{4,M}(n)=[g_{4,1}, g_{4,2}, \ldots, g_{4,M-1}, g_{4,M}]$.

In some demonstrative embodiments, the STBC blocking structure of FIG. 4 may be generalized for any other number of $N_{STS}$ space-time streams, e.g., $N_{STS}$ may be equal to or greater than 2.

Figure 5:
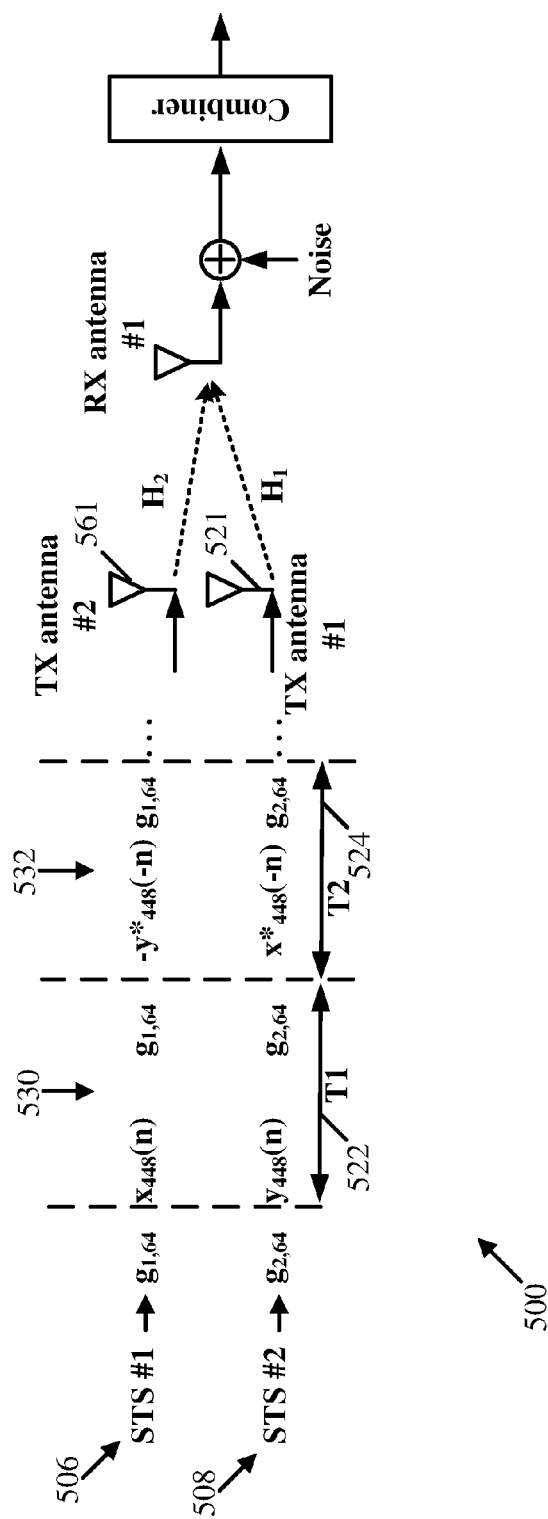
FIG. 5 is a schematic illustration of a SC Physical layer (PHY) transmission according to a STBC scheme, in accordance with some demonstrative embodiments.

Reference is made to FIG. 5, which schematically illustrates a SC PHY transmission 500 according to a STBC scheme, in accordance with some demonstrative embodiments. For example, as shown in FIG. 5, the SC transmission may include a 2×1 transmission with the STBC scheme.

In some demonstrative embodiments, devices 102 (FIG. 1) and/or 140 (FIG. 1) may be configured to communicate the SC PHY transmission 500 according to the STBC scheme, which may be configured, for example, for 2×1 transmission with the STBC scheme, e.g., as described below.

In some demonstrative embodiments, as shown in FIG. 5, symbols of a first spatial stream 506, denoted STS#1, and a second spatial stream 508, denoted STS#2, may include the symbols of space-time streams 306 and 308 (FIG. 3), respectively.

In some demonstrative embodiments, as shown in FIG. 5, a first symbol 530, e.g., corresponding to a first SC symbol, may include the sequences 310 and 314 (FIG. 3), in first space-time stream 506 to be transmitted via a first antenna 561 at a first time interval 522, e.g., at the time T. For example, first symbol 530 in first space-time stream 506 may be transmitted during the first time interval 522.

In some demonstrative embodiments, as shown in FIG. 5, the first symbol 530, e.g., the first SC symbol, may include the sequences 312 and 316 (FIG. 3), in second space-time stream 508 to be transmitted via a second antenna 521 at the time T. For example, first symbol 530 in second space-time stream 508 may be transmitted during first time interval 522.

In some demonstrative embodiments, as shown in FIG. 5, a second symbol 532, e.g., corresponding to a second SC symbol, subsequent to the symbol 530, may include the sequences 318 and 314 (FIG. 3), in first space-time stream 506 to be transmitted via first antenna 561 at a second time interval 524, e.g., at the time T+t, subsequent to the first time. For example, second symbol 532 in first space-time stream 506 may be transmitted during the second time interval 524.

In some demonstrative embodiments, as shown in FIG. 5, the second symbol 532, e.g., corresponding to the second SC symbol, subsequent to the symbol 530, may include the sequences 320 and 316 (FIG. 3), in second space-time stream 508 to be transmitted via second antenna 521 at the time T+t. For example, second symbol 532 in second space-time stream 508 may be transmitted during a second time interval 524.

In some demonstrative embodiments, devices 102 (FIG. 1) and/or 140 (FIG. 1) may be configured to communicate first space-time stream 506 via a first communication channel, denoted H1.

In some demonstrative embodiments, devices 102 (FIG. 1) and/or 140 (FIG. 1) may be configured to communicate second space-time stream 508 via a second communication channel, denoted H2.

In some demonstrative embodiments, a signal transmitted during first interval 522, denoted T1, in the frequency domain, e.g., in first space-time stream 506, denoted STS#1, and second space-time stream 508, denoted STS#2, may be defined as a superposition of the data and GI signals, e.g., as follows:

$$STS\#1: X_{T1}(k) = X(k) + G_1(k);$$

$$STS\#2: Y_{T1}(k) = Y(k) + G_2(k); \quad (1)$$

where: $X = DFT(x)$, $Y = DFT(y)$, $G_1 = DFT(g_1)$, $G_2 = DFT(g_2)$.

In one example, the transmitted signal may be defined for M=64 and N=512, as described below, for the certainty of explanation, e.g., with respect to parameters in compliance with a legacy case. In other embodiments, any other values of M and/or N may be used.

For example, the signals x, y, $g_1$ and $g_2$ in the time domain may be defined, e.g., as follows:

$$x(n) = \begin{cases} x_{448}(n), & n = 0:447 \\ 0, & n = 448:511 \end{cases} \quad (2)$$

$$y(n) = \begin{cases} y_{448}(n), & n = 0:447 \\ 0, & n = 448:511 \end{cases}$$

$$g_1(n) = \begin{cases} 0, & n = 0:447 \\ g_{1,64}(n - 448), & n = 448:511 \end{cases}$$

$$g_2(n) = \begin{cases} 0, & n = 0:447 \\ g_{2,64}(n - 448), & n = 448:511 \end{cases}$$

According to these definitions, the signal vectors x, y, $g_1$ and $g_2$ may be orthogonal in the time domain.

Referring back to FIG. 1, in some demonstrative embodiments, controller 154 may be configured to cause, trigger, and/or control a wireless station implemented by device 140 to process a SC transmission, e.g., a SC STBC transmission, received from another station, for example, the station implemented by device 102, e.g., as described below.

In some demonstrative embodiments, controller 154 may be configured to cause, trigger, and/or control the wireless station implemented by device 140, to process the SC STBC transmission received via one or more antennas 147 of device 140.

In some demonstrative embodiments, controller 154 may be configured to cause, trigger, and/or control the wireless station implemented by device 140, to receive and process the SC STBC according to an STBC structure corresponding to a plurality of space-time streams, e.g., as described below.

In some demonstrative embodiments, controller 154 may be configured to cause, trigger, and/or control the wireless station implemented by device 140, to demodulate at least a first space-time stream and a second space-time stream from the SC STBC transmission. The first space-time stream may include, in a first interval, a first data sequence followed by a first GI sequence, the second space-time stream may include, in the first interval, a second data sequence followed by a second GI sequence, the first space time stream may include, in a second interval subsequent to the first interval, a sign-inverted and time-inverted complex conjugate of the second data sequence followed by the first GI sequence, and/or the second stream may include, in the second interval, a time-inverted complex conjugate of the first data sequence followed by the second GI sequence, e.g., as described below.

In some demonstrative embodiments, controller 154 may be configured to cause, trigger, and/or control the wireless station implemented by device 140, to demodulate the SC STBC transmission according to a Linear Minimum Mean Square Error (LMMSE) scheme, e.g., as described below.

In other embodiments, controller 154 may be configured to cause, trigger, and/or control the wireless station implemented by device 140, to demodulate the SC STBC transmission according to any other additional or alternative demodulation scheme.

In some demonstrative embodiments, controller 154 may be configured to cause, trigger, and/or control the wireless station implemented by device 140, to receive and process the SC STBC transmission encoded according to the STBC symbol blocking mapping, for example, the STBC symbol blocking mapping of FIG. 3 or 4, e.g., as described below.

In some demonstrative embodiments, controller 154 may be configured to cause, trigger, and/or control a wireless station implemented by device 140, to process the received SC STBC transmission according to a demodulation scheme, which may be configured for data and GIs demodulation according to an STBC structure.

In some demonstrative embodiments, controller 154 may include, operate as, and/or perform the functionality of a demodulator 157, which may be configured to demodulate the received SC STBC transmission, e.g., as described below.

In some demonstrative embodiments, the received SC STBC transmission may include a plurality of space-time streams, e.g., as described above.

In some demonstrative embodiments, demodulator 157 may be configured to demodulate the plurality of space-time streams of the SC STBC transmission, for example, according to the STBC structure, e.g., as described below.

In some demonstrative embodiments, demodulator 157 may be configured to demodulate at least a first space-time stream and a second space-time stream.

For example, the first space-time stream may include first space-time stream 306 (FIG. 3), and/or the second space-time stream may include second space-time stream 308 (FIG. 3).

In some demonstrative embodiments, at the receiver side, e.g., at device 140, a space-time demodulation technique, for example, an STBC demodulation technique, e.g., an Alamouti demodulation technique or any other STBC demodulation scheme, may be used, for example, to demodulate at least the first space-time stream, e.g., first space-time stream 306 (FIG. 3), and/or the second space-time stream, e.g., second space-time stream 308 (FIG. 3), e.g., as described below.

In some demonstrative embodiments, the received signals, for example, by an antenna 147 of device 140, denoted RX#1, in the frequency domain for time intervals T1 and T2, e.g., intervals 522 and 524 (FIG. 5) respectively, may be defined, e.g., as follows:

RX #1, time interval T1:

$$R_{T1}(k)=H_1(k)*X(k)+H_2(k)*Y(k)+H_1(k)*G_1(k)+H_2(k)*G_2(k)+Z_{T1}(k);$$

RX #1, time interval T2:

$$R_{T2}(k)=ph(k)*(H_1(k)*X*(k)-H_2(k)*Y*(k))+H_1(k)*G_1(k)+H_2(k)*G_2(k)+Z_{T2}(k); \quad (3)$$

where:
ph(k)=exp(+j(2π/512)*Δt*k), Δt=65 chips;
X(k) and Y(k)—data signals;
$G_1(k)$ and $G_2(k)$—GI signals;
$Z_{T1}(k)$ and $Z_{T2}(k)$–AWGN~CN(0, σ²) noise samples.

In some demonstrative embodiments, the demodulation scheme may be configured with respect to a transmission received via one receive antenna, e.g., as described above. In other embodiments, the demodulation scheme may be generalized for any other number of Rx antennas.

In some demonstrative embodiments, during the time interval T2 the data part signals X* and Y* may be transmitted, for example, while being multiplied by the phasorph (k) value.

In some demonstrative embodiments, the operation of the phasorph(k) can be explained, e.g., as described below.

For example, in the STS #2, e.g., second space-time stream 508 (FIG. 5) and time interval T2, the transmitted signal may be defined as follows:

$$x*(-n)=(x*(447),x*(446),\ldots,x*(0),0_0,0_1,\ldots,0_{63}) \quad (4)$$

For example, the phasor operation applied in the frequency domain may result in a cyclic shift in the time domain, e.g., as follows:

$$x^-(n)=(x*(0),0_0,0_1,\ldots,0_{63},x*(447),x*(446),x*(1)) \quad (5)$$

For example, due to the property of the Discrete Fourier Transform (DFT), the phasor operation may result in complex conjugated subcarriers in the frequency domain, for example, X*(k)=DFT(x~(n)).

Accordingly, DFT(x*(-n))*exp(-j(2π/512)*65*k)= X*(k); and DFT(x*(-n))=X*(k)*exp(+j(2π/512)*65*k).

In some demonstrative embodiments, the phasor may be treated, for example, as a part of the channel transmission.

In some demonstrative embodiments, controller 154 may be configured to cause, trigger, and/or control the wireless station implemented by device 140, to apply a LMMSE solution for the data part of the SC STBC transmission, e.g., as follows:

$$\begin{bmatrix} X^\wedge(k) \\ Y^\wedge(k) \end{bmatrix} = \frac{1}{|H_1(k)|^2+|H_2(k)|^2+\sigma^2} \cdot \begin{bmatrix} H_1^*(k) & H_2(k)e^{-j\frac{2\pi}{512}k65} \\ H_2^*(k) & -H_1(k)e^{-j\frac{2\pi}{512}k65} \end{bmatrix} \cdot \begin{bmatrix} R_{T1}(k) \\ R_{T2}^*(k) \end{bmatrix} \quad (6)$$

wherein X^(k) and Y^(k) denote estimated X and Y signals at the subcarrier with the index k.

In some demonstrative embodiments, the LMMSE solution may provide, for example, data estimation in the frequency domain, which, in turn, may be transformed into the time domain, for example, by applying an Inverse DFT (IDFT), for example, to obtain the estimations x^(n) and y^(n).

In some demonstrative embodiments, such an equalizer solution may be based on an assumption that $H^\wedge_1(k)\sim=H_1(k)$ and $H^\wedge_2(k)\sim=H_2(k)$ for simplicity, e.g., assuming that channel estimation accuracy is good enough.

In some demonstrative embodiments, the equalizer solution may be computed only once, e.g., during a channel estimation stage.

In some demonstrative embodiments, the station receiving the transmission, e.g., the wireless station implemented by device 140, may be configured to apply an LMMSE solution for the GI part of the transmission, e.g., as described below.

In some demonstrative embodiments, the equalizer solution may provide a good equalization, e.g., a "perfect" equalization, of the data part only, for example, while not providing equalization for the GI part of the signal.

In some demonstrative embodiments, GI sequences may not be "perfectly" equalized, e.g., after conversion into the time domain.

In some demonstrative embodiments, known GIs may be used, for example, for one or more PHY estimations at a receiver side, e.g., as described below.

In some demonstrative embodiments, the fact that the GI signals may be known to the receiver, may allow to pre-calculate the GIs, for example, during a channel estimation stage, e.g., as follows:

$$\begin{bmatrix} G_1^\wedge(k) \\ G_2^\wedge(k) \end{bmatrix} = \frac{1}{|H_1(k)|^2+|H_2(k)|^2+\sigma^2} \cdot \begin{bmatrix} H_1^*(k) & H_2(k)e^{-j\frac{2\pi}{512}k65} \\ H_2^*(k) & -H_1(k)e^{-j\frac{2\pi}{512}k65} \end{bmatrix}. \quad (7)$$

-continued $$\begin{bmatrix} H_1(k)G_1(k) + H_2(k)G_2(k) \\ H_1^*(k)G_1^*(k) + H_2^*(k)G_2^*(k) \end{bmatrix} \Rightarrow g_{\tilde{1}} = IDFT(G_{\tilde{1}}), g_{\tilde{2}} = IDFT(G_{\tilde{2}})$$

For example, the signals g~1 and/or g~2 may be used for phase tracking in time domain, e.g., as known GIs.

In some demonstrative embodiments, there may be no Inter Symbol Interference (ISI) for the data, and, accordingly, GI transition area after considered equalization.

In some demonstrative embodiments, the data and GI may be well isolated after application of equalization and, accordingly, data "leakage" may be relatively small.

Figure 6:
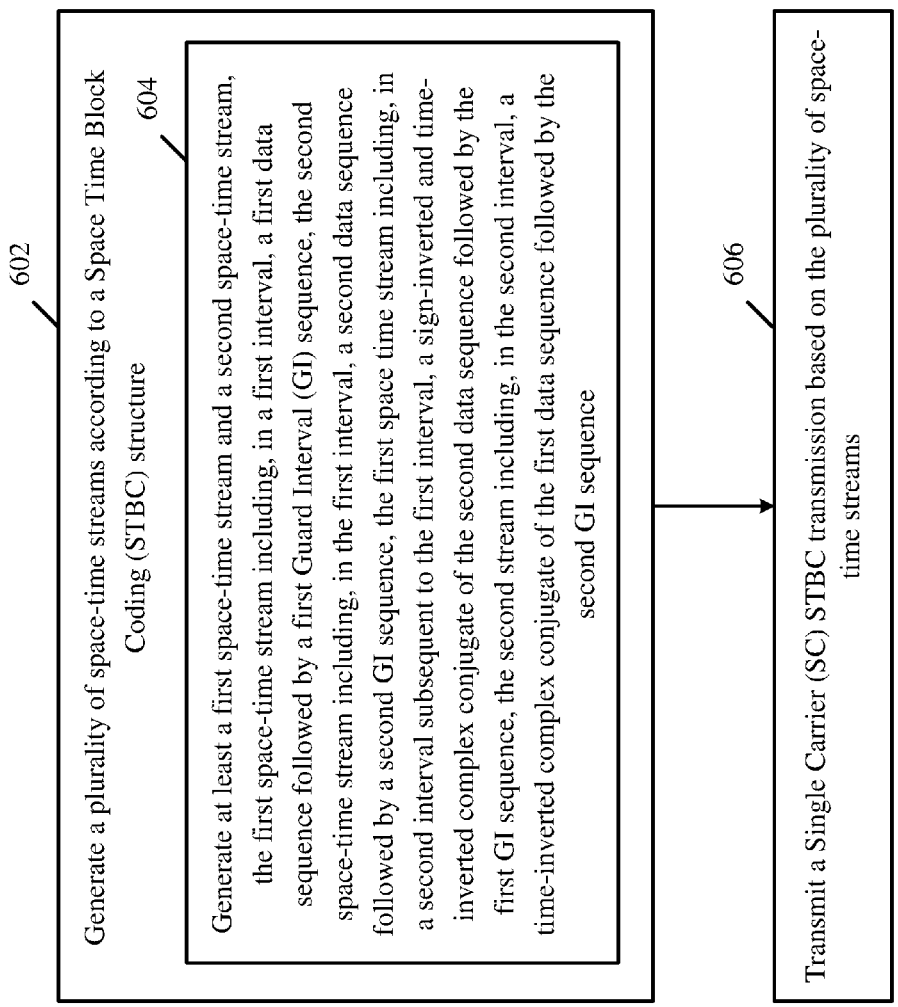
FIG. 6 is a schematic illustration of a method of communicating a SC STBC transmission, in accordance with some demonstrative embodiments.

Reference is made to FIG. 6, which schematically illustrates a method of communicating a SC STBC transmission, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a data mapper, e.g., data mapper 125 (FIG. 1); a time-frequency converter, e.g., time-frequency converter 127 (FIG. 1); a spatial stream mapper, e.g., spatial stream mapper 129 (FIG. 1); a demodulator, e.g., demodulator 157 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 602, the method may include generating a plurality of space-time streams according to a STBC structure. For example, controller 124 (FIG. 1) may be configured to cause, trigger, and/or control the wireless station implemented by device 102 (FIG. 1) to generate a plurality of space-time streams according to a STBC structure, e.g., as described above.

As indicated at block 604, generating the plurality of space-time streams may include generating at least a first space-time stream and a second space-time stream, the first space-time stream including, in a first interval, a first data sequence followed by a first GI sequence, the second space-time stream including, in the first interval, a second data sequence followed by a second GI sequence, the first space time stream including, in a second interval subsequent to the first interval, a sign-inverted and time-inverted complex conjugate of the second data sequence followed by the first GI sequence, the second stream including, in the second interval, a time-inverted complex conjugate of the first data sequence followed by the second GI sequence. For example, controller 124 (FIG. 1) may be configured to cause, trigger, and/or control the wireless station implemented by device 102 (FIG. 1) to generate the first and second space-time streams, for example, according to SC block structure 300 (FIG. 3) or SC block structure 400 (FIG. 4), e.g., as described above.

As indicated at block 606, the method may include transmitting a SC STBC transmission based on the plurality of space-time streams. For example, controller 124 (FIG. 1) may be configured to cause, trigger, and/or control the wireless station implemented by device 102 (FIG. 1) to transmit a SC STBC transmission based on the plurality of space-time streams, for example, according to the STBC scheme of FIG. 3, or FIG. 4, e.g., as described above.

Figure 7:
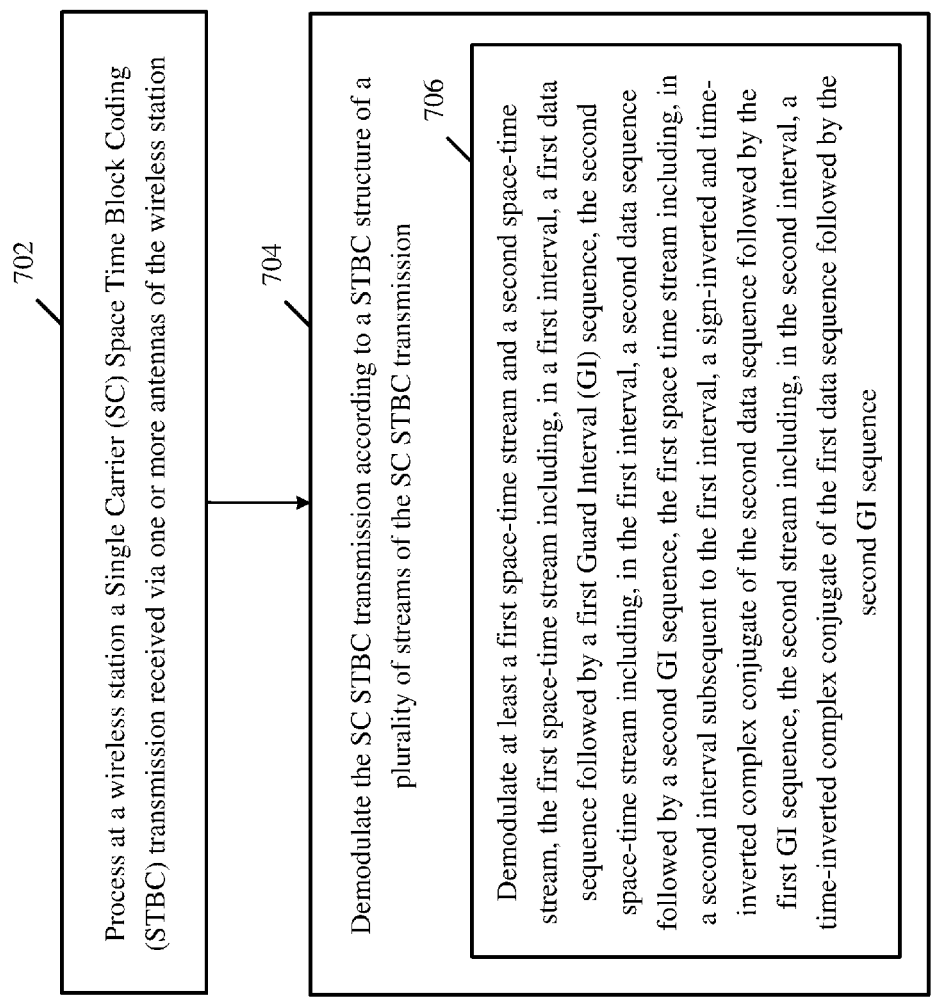
FIG. 7 is a schematic illustration of a method of communicating a SC STBC transmission, in accordance with some demonstrative embodiments.

Reference is made to FIG. 7, which schematically illustrates a method of communicating a SC STBC transmission, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a data mapper, e.g., data mapper 125 (FIG. 1); a time-frequency converter, e.g., time-frequency converter 127 (FIG. 1); a spatial stream mapper, e.g., spatial stream mapper 129 (FIG. 1); a demodulator, e.g., demodulator 157 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 702, the method may include processing a SC STBC transmission received via one or more antennas of a wireless station. For example, controller 154 (FIG. 1) may be configured to cause, trigger, and/or control the wireless station implemented by device 140 (FIG. 1) to process a SC STBC transmission received via one or more antennas 147 (FIG. 1) of device 140 (FIG. 1), e.g., as described above.

As indicated at block 704, the method may include demodulating the SC STBC transmission according to a STBC structure of a plurality of streams of the SC STBC transmission. For example, controller 154 (FIG. 1) may be configured to cause, trigger, and/or control the wireless station implemented by device 140 (FIG. 1) to demodulate the SC STBC transmission according to the STBC structure of the plurality of streams of the SC STBC transmission, e.g., as described above.

As indicated at block 706, demodulating the SC STBC transmission may include demodulating at least a first space-time stream and a second space-time stream, the first space-time stream including, in a first interval, a first data sequence followed by a first Guard Interval (GI) sequence, the second space-time stream including, in the first interval, a second data sequence followed by a second GI sequence, the first space time stream including, in a second interval subsequent to the first interval, a sign-inverted and time-inverted complex conjugate of the second data sequence followed by the first GI sequence, the second stream including, in the second interval, a time-inverted complex conjugate of the first data sequence followed by the second GI sequence. For example, controller 154 (FIG. 1) may be configured to cause, trigger, and/or control the wireless station implemented by device 140 (FIG. 1) to demodulate the first and second space-time streams, e.g., as described above.

Figure 8:
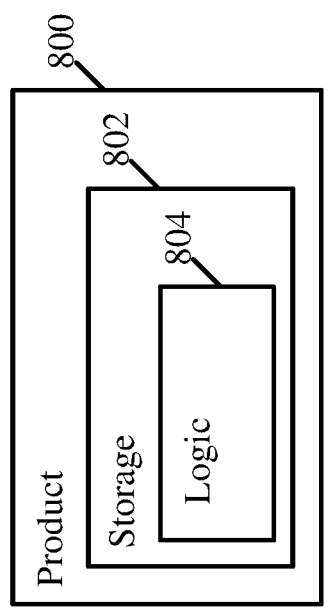
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable non-transitory storage media 802, which may include computer-executable instructions, e.g., implemented by logic 804, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), spatial stream mapper 129 (FIG. 1), demodulator 157 (FIG. 1), data mapper 125 (FIG. 1), time-frequency converter 127 (FIG. 1), message processor 128 (FIG. 1), and/or message processor 158 (FIG. 1), to cause device 102 (FIG. 1), device 140 (FIG. 1), radio 114 (FIG. 1), radio 144 (FIG.

1), transmitter 118 (FIG. 1), transmitter 148 (FIG. 1), receiver 116 (FIG. 1), receiver 146 (FIG. 1), controller 124 (FIG. 1), controller 154 (FIG. 1), Golay sequence generator 129 (FIG. 1), spatial stream mapper 129 (FIG. 1), demodulator 157 (FIG. 1), data mapper 125 (FIG. 1), time-frequency converter 127 (FIG. 1), message processor 128 (FIG. 1), and/or message processor 158 (FIG. 1), to perform one or more operations, and/or to perform, trigger and/or implement one or more operations, communications and/or functionalities described above with reference to FIGS. 1, 2, 3, 4, 5, 6, and/or 7, and/or one or more operations described herein. The phrase "non-transitory machine-readable medium" is directed to include all computer-readable media, with the sole exception being a transitory propagating signal.

In some demonstrative embodiments, product 800 and/or machine-readable storage media 802 may include one or more types of computer-readable storage media capable of storing data, including volatile memory, non-volatile memory, removable or non-removable memory, erasable or non-erasable memory, writeable or rewriteable memory, and the like. For example, machine-readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to generate a plurality of space-time streams according to a Space Time Block Coding (STBC) structure, the plurality of space-time streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream comprising, in the second interval, a time-inverted complex conjugate of the first data sequence followed by the second GI sequence; and transmit a Single Carrier (SC) STBC transmission based on the plurality of space-time streams.

Example 2 includes the subject matter of Example 1, and optionally, wherein the first GI sequence is different from the second GI sequence.

Example 3 includes the subject matter of Example 1 or 2, and optionally, wherein each of the first and second GI sequences has a length of M samples, and each of the first and second data sequences has a length of (N–M) samples, wherein N denotes a Discrete Fourier Transform (DFT) size of each of the first and second intervals.

Example 4 includes the subject matter of any one of Examples 1-3, and optionally, wherein the first GI sequence and the second GI sequence have a same length.

Example 5 includes the subject matter of any one of Examples 1-4, and optionally, wherein each of the first and second GI sequences has a length of 32 samples or 64 samples.

Example 6 includes the subject matter of any one of Examples 1-5, and optionally, wherein each of the first and second GI sequences comprises a Golay sequence.

Example 7 includes the subject matter of any one of Examples 1-6, and optionally, wherein the plurality of space-time streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space time stream comprising, in the second interval, a sign-inverted and time-inverted complex conjugate of the fourth data sequence followed by the third GI sequence, the fourth stream comprising, in the second interval, a time-inverted complex conjugate of the third data sequence followed by the fourth GI sequence.

Example 8 includes the subject matter of any one of Examples 1-7, and optionally, wherein the apparatus is configured to cause the wireless station to convert the plurality of space-time streams into a respective plurality of frequency-domain streams in a frequency domain, and to map the plurality of frequency domain streams to a plurality of frequency domain spatial streams according to an STBC scheme.

Example 9 includes the subject matter of Example 8, and optionally, wherein the STBC scheme comprises an Alamouti scheme.

Example 10 includes the subject matter of any one of Examples 1-9, and optionally, wherein the apparatus is configured to cause the wireless station to transmit a first spatial stream of the SC STBC transmission via a first antenna and a second spatial stream of the SC STBC transmission via a second antenna.

Example 11 includes the subject matter of any one of Examples 1-10, and optionally, wherein the SC STBC transmission comprises an NT×NR SC transmission, wherein NT is an integer equal to or greater than 2, and NR is an integer equal to or greater than 1.

Example 12 includes the subject matter of any one of Examples 1-11, and optionally, wherein the SC STBC transmission comprises a SC Multiple-Input-Multiple-Output (MIMO) transmission.

Example 13 includes the subject matter of any one of Examples 1-12, and optionally, wherein the first and second intervals comprise Discrete Fourier Transform (DFT) intervals.

Example 14 includes the subject matter of any one of Examples 1-13, and optionally, wherein the apparatus is configured to cause the wireless station to transmit the SC STBC transmission over a Directional Multi-Gigabit (DMG) band.

Example 15 includes the subject matter of any one of Examples 1-14, and optionally, wherein the wireless station is a Directional Multi-Gigabit (DMG) Station (STA).

Example 16 includes the subject matter of any one of Examples 1-15, and optionally, comprising a plurality of directional antennas to transmit the SC STBC transmission.

Example 17 includes the subject matter of any one of Examples 1-16, and optionally, comprising a radio, a memory, and a processor.

Example 18 includes a system of wireless communication comprising a wireless station, the wireless station comprising a plurality of directional antennas; a radio; a memory; a processor; and a controller configured to cause the wireless station to generate a plurality of space-time streams according to a Space Time Block Coding (STBC) structure, the plurality of space-time streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream comprising, in the second interval, a time-inverted complex conjugate of the first data sequence followed by the second GI sequence; and transmit a Single Carrier (SC) STBC transmission based on the plurality of space-time streams.

Example 19 includes the subject matter of Example 18, and optionally, wherein the first GI sequence is different from the second GI sequence.

Example 20 includes the subject matter of Example 18 or 19, and optionally, wherein each of the first and second GI sequences has a length of M samples, and each of the first and second data sequences has a length of (N−M) samples, wherein N denotes a Discrete Fourier Transform (DFT) size of each of the first and second intervals.

Example 21 includes the subject matter of any one of Examples 18-20, and optionally, wherein the first GI sequence and the second GI sequence have a same length.

Example 22 includes the subject matter of any one of Examples 18-21, and optionally, wherein each of the first and second GI sequences has a length of 32 samples or 64 samples.

Example 23 includes the subject matter of any one of Examples 18-22, and optionally, wherein each of the first and second GI sequences comprises a Golay sequence.

Example 24 includes the subject matter of any one of Examples 18-23, and optionally, wherein the plurality of space-time streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space time stream comprising, in the second interval, a sign-inverted and time-inverted complex conjugate of the fourth data sequence followed by the third GI sequence, the fourth stream comprising, in the second interval, a time-inverted complex conjugate of the third data sequence followed by the fourth GI sequence.

Example 25 includes the subject matter of any one of Examples 18-24, and optionally, wherein the controller is configured to cause the wireless station to convert the plurality of space-time streams into a respective plurality of frequency-domain streams in a frequency domain, and to map the plurality of frequency domain streams to a plurality of frequency domain spatial streams according to an STBC scheme.

Example 26 includes the subject matter of Example 25, and optionally, wherein the STBC scheme comprises an Alamouti scheme.

Example 27 includes the subject matter of any one of Examples 18-26, and optionally, wherein the controller is configured to cause the wireless station to transmit a first spatial stream of the SC STBC transmission via a first antenna and a second spatial stream of the SC STBC transmission via a second antenna.

Example 28 includes the subject matter of any one of Examples 18-27, and optionally, wherein the SC STBC transmission comprises an NT×NR SC transmission, wherein NT is an integer equal to or greater than 2, and NR is an integer equal to or greater than 1.

Example 29 includes the subject matter of any one of Examples 18-28, and optionally, wherein the SC STBC transmission comprises a SC Multiple-Input-Multiple-Output (MIMO) transmission.

Example 30 includes the subject matter of any one of Examples 18-29, and optionally, wherein the first and second intervals comprise Discrete Fourier Transform (DFT) intervals.

Example 31 includes the subject matter of any one of Examples 18-30, and optionally, wherein the controller is configured to cause the wireless station to transmit the SC STBC transmission over a Directional Multi-Gigabit (DMG) band.

Example 32 includes the subject matter of any one of Examples 18-31, and optionally, wherein the wireless station is a Directional Multi-Gigabit (DMG) Station (STA).

Example 33 includes the subject matter of any one of Examples 18-32, and optionally, wherein the plurality of directional antennas are to transmit the SC STBC transmission.

Example 34 includes a method to be performed at a wireless station, the method comprising generating a plurality of space-time streams according to a Space Time Block Coding (STBC) structure, the plurality of space-time streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream comprising, in the second interval, a time-inverted complex conjugate of the first data sequence followed by the second GI sequence; and transmitting a Single Carrier (SC) STBC transmission based on the plurality of space-time streams.

Example 35 includes the subject matter of Example 34, and optionally, wherein the first GI sequence is different from the second GI sequence.

Example 36 includes the subject matter of Example 34 or 35, and optionally, wherein each of the first and second GI sequences has a length of M samples, and each of the first and second data sequences has a length of (N−M) samples, wherein N denotes a Discrete Fourier Transform (DFT) size of each of the first and second intervals.

Example 37 includes the subject matter of any one of Examples 34-36, and optionally, wherein the first GI sequence and the second GI sequence have a same length.

Example 38 includes the subject matter of any one of Examples 34-37, and optionally, wherein each of the first and second GI sequences has a length of 32 samples or 64 samples.

Example 39 includes the subject matter of any one of Examples 34-38, and optionally, wherein each of the first and second GI sequences comprises a Golay sequence.

Example 40 includes the subject matter of any one of Examples 34-39, and optionally, wherein the plurality of space-time streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space time stream comprising, in the second interval, a sign-inverted and time-inverted complex conjugate of the fourth data sequence followed by the third GI sequence, the fourth stream comprising, in the second interval, a time-inverted complex conjugate of the third data sequence followed by the fourth GI sequence.

Example 41 includes the subject matter of any one of Examples 34-40, and optionally, comprising converting the plurality of space-time streams into a respective plurality of frequency-domain streams in a frequency domain, and mapping the plurality of frequency domain streams to a plurality of frequency domain spatial streams according to an STBC scheme.

Example 42 includes the subject matter of Example 41, and optionally, wherein the STBC scheme comprises an Alamouti scheme.

Example 43 includes the subject matter of any one of Examples 34-42, and optionally, comprising transmitting a first spatial stream of the SC STBC transmission via a first antenna and a second spatial stream of the SC STBC transmission via a second antenna.

Example 44 includes the subject matter of any one of Examples 34-43, and optionally, wherein the SC STBC transmission comprises an NT×NR SC transmission, wherein NT is an integer equal to or greater than 2, and NR is an integer equal to or greater than 1.

Example 45 includes the subject matter of any one of Examples 34-44, and optionally, wherein the SC STBC transmission comprises a SC Multiple-Input-Multiple-Output (MIMO) transmission.

Example 46 includes the subject matter of any one of Examples 34-45, and optionally, wherein the first and second intervals comprise Discrete Fourier Transform (DFT) intervals.

Example 47 includes the subject matter of any one of Examples 34-46, and optionally, comprising transmitting the SC STBC transmission over a Directional Multi-Gigabit (DMG) band.

Example 48 includes the subject matter of any one of Examples 34-47, and optionally, wherein the wireless station is a Directional Multi-Gigabit (DMG) Station (STA).

Example 49 includes a product comprising one or more tangible computer-readable non-transitory storage media comprising computer-executable instructions operable to, when executed by at least one computer processor, enable the at least one computer processor to cause a wireless station to generate a plurality of space-time streams according to a Space Time Block Coding (STBC) structure, the plurality of space-time streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream comprising, in the second interval, a time-inverted complex conjugate of the first data sequence followed by the second GI sequence; and transmit a Single Carrier (SC) STBC transmission based on the plurality of space-time streams.

Example 50 includes the subject matter of Example 49, and optionally, wherein the first GI sequence is different from the second GI sequence.

Example 51 includes the subject matter of Example 49 or 50, and optionally, wherein each of the first and second GI sequences has a length of M samples, and each of the first and second data sequences has a length of (N−M) samples, wherein N denotes a Discrete Fourier Transform (DFT) size of each of the first and second intervals.

Example 52 includes the subject matter of any one of Examples 49-51, and optionally, wherein the first GI sequence and the second GI sequence have a same length.

Example 53 includes the subject matter of any one of Examples 49-52, and optionally, wherein each of the first and second GI sequences has a length of 32 samples or 64 samples.

Example 54 includes the subject matter of any one of Examples 49-53, and optionally, wherein each of the first and second GI sequences comprises a Golay sequence.

Example 55 includes the subject matter of any one of Examples 49-54, and optionally, wherein the plurality of space-time streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space time stream comprising, in the second interval, a sign-inverted and time-inverted complex conjugate of the fourth data sequence followed by the third GI sequence, the fourth stream comprising, in the second interval, a time-inverted complex conjugate of the third data sequence followed by the fourth GI sequence.

Example 56 includes the subject matter of any one of Examples 49-55, and optionally, wherein the instructions, when executed, cause the wireless station to convert the plurality of space-time streams into a respective plurality of frequency-domain streams in a frequency domain, and to map the plurality of frequency domain streams to a plurality of frequency domain spatial streams according to an STBC scheme.

Example 57 includes the subject matter of Example 56, and optionally, wherein the STBC scheme comprises an Alamouti scheme.

Example 58 includes the subject matter of any one of Examples 49-57, and optionally, wherein the instructions, when executed, cause the wireless station to transmit a first spatial stream of the SC STBC transmission via a first antenna and a second spatial stream of the SC STBC transmission via a second antenna.

Example 59 includes the subject matter of any one of Examples 49-58, and optionally, wherein the SC STBC transmission comprises an NTxNR SC transmission, wherein NT is an integer equal to or greater than 2, and NR is an integer equal to or greater than 1.

Example 60 includes the subject matter of any one of Examples 49-59, and optionally, wherein the SC STBC transmission comprises a SC Multiple-Input-Multiple-Output (MIMO) transmission.

Example 61 includes the subject matter of any one of Examples 49-60, and optionally, wherein the first and second intervals comprise Discrete Fourier Transform (DFT) intervals.

Example 62 includes the subject matter of any one of Examples 49-61, and optionally, wherein the instructions, when executed, cause the wireless station to transmit the SC STBC transmission over a Directional Multi-Gigabit (DMG) band.

Example 63 includes the subject matter of any one of Examples 49-62, and optionally, wherein the wireless station is a Directional Multi-Gigabit (DMG) Station (STA).

Example 64 includes an apparatus of wireless communication by a wireless station, the apparatus comprising means for generating a plurality of space-time streams according to a Space Time Block Coding (STBC) structure, the plurality of space-time streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream comprising, in the second interval, a time-inverted complex conjugate of the first data sequence followed by the second GI sequence; and means for transmitting a Single Carrier (SC) STBC transmission based on the plurality of space-time streams.

Example 65 includes the subject matter of Example 64, and optionally, wherein the first GI sequence is different from the second GI sequence.

Example 66 includes the subject matter of Example 64 or 65, and optionally, wherein each of the first and second GI sequences has a length of M samples, and each of the first and second data sequences has a length of (N–M) samples, wherein N denotes a Discrete Fourier Transform (DFT) size of each of the first and second intervals.

Example 67 includes the subject matter of any one of Examples 64-66, and optionally, wherein the first GI sequence and the second GI sequence have a same length.

Example 68 includes the subject matter of any one of Examples 64-67, and optionally, wherein each of the first and second GI sequences has a length of 32 samples or 64 samples.

Example 69 includes the subject matter of any one of Examples 64-68, and optionally, wherein each of the first and second GI sequences comprises a Golay sequence.

Example 70 includes the subject matter of any one of Examples 64-69, and optionally, wherein the plurality of space-time streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space time stream comprising, in the second interval, a sign-inverted and time-inverted complex conjugate of the fourth data sequence followed by the third GI sequence, the fourth stream comprising, in the second interval, a time-inverted complex conjugate of the third data sequence followed by the fourth GI sequence.

Example 71 includes the subject matter of any one of Examples 64-70, and optionally, comprising means for converting the plurality of space-time streams into a respective plurality of frequency-domain streams in a frequency domain, and mapping the plurality of frequency domain streams to a plurality of frequency domain spatial streams according to an STBC scheme.

Example 72 includes the subject matter of Example 71, and optionally, wherein the STBC scheme comprises an Alamouti scheme.

Example 73 includes the subject matter of any one of Examples 64-72, and optionally, comprising means for transmitting a first spatial stream of the SC STBC transmission via a first antenna and a second spatial stream of the SC STBC transmission via a second antenna.

Example 74 includes the subject matter of any one of Examples 64-73, and optionally, wherein the SC STBC transmission comprises an NTxNR SC transmission, wherein NT is an integer equal to or greater than 2, and NR is an integer equal to or greater than 1.

Example 75 includes the subject matter of any one of Examples 64-74, and optionally, wherein the SC STBC transmission comprises a SC Multiple-Input-Multiple-Output (MIMO) transmission.

Example 76 includes the subject matter of any one of Examples 64-75, and optionally, wherein the first and second intervals comprise Discrete Fourier Transform (DFT) intervals.

Example 77 includes the subject matter of any one of Examples 64-76, and optionally, comprising means for transmitting the SC STBC transmission over a Directional Multi-Gigabit (DMG) band.

Example 78 includes the subject matter of any one of Examples 64-77, and optionally, wherein the wireless station is a Directional Multi-Gigabit (DMG) Station (STA).

Example 79 includes an apparatus comprising logic and circuitry configured to cause a wireless station to process a Single Carrier (SC) Space Time Block Coding (STBC) transmission received via one or more antennas of the wireless station; and demodulate the SC STBC transmission according to a STBC structure of a plurality of streams of the SC STBC transmission, the plurality of streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream comprising, in the second interval, a time-inverted complex conjugate of the first data sequence followed by the second GI sequence.

Example 80 includes the subject matter of Example 79, and optionally, wherein the apparatus is configured to cause the wireless station to demodulate the SC STBC transmission according to a Linear Minimum Mean Square Error (LMMSE) scheme.

Example 81 includes the subject matter of Example 79 or 80, and optionally, wherein the first GI sequence is different from the second GI sequence.

Example 82 includes the subject matter of any one of Examples 79-81, and optionally, wherein each of the first and second GI sequences has a length of M samples, and each of the first and second data sequences has a length of (N−M) samples, wherein N denotes a Discrete Fourier Transform (DFT) size of each of the first and second intervals.

Example 83 includes the subject matter of any one of Examples 79-82, and optionally, wherein the first GI sequence and the second GI sequence have a same length.

Example 84 includes the subject matter of any one of Examples 79-83, and optionally, wherein each of the first and second GI sequences has a length of 32 samples or 64 samples.

Example 85 includes the subject matter of any one of Examples 79-84, and optionally, wherein each of the first and second GI sequences comprises a Golay sequence.

Example 86 includes the subject matter of any one of Examples 79-85, and optionally, wherein the plurality of streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space time stream comprising, in the second interval, a sign-inverted and time-inverted complex conjugate of the fourth data sequence followed by the third GI sequence, the fourth stream comprising, in the second interval, a time-inverted complex conjugate of the third data sequence followed by the fourth GI sequence.

Example 87 includes the subject matter of any one of Examples 79-86, and optionally, wherein the SC STBC transmission comprises an NT×NR SC transmission, wherein NT is an integer equal to or greater than 2, and NR is an integer equal to or greater than 1.

Example 88 includes the subject matter of any one of Examples 79-87, and optionally, wherein the SC STBC transmission comprises a SC Multiple-Input-Multiple-Output (MIMO) transmission.

Example 89 includes the subject matter of any one of Examples 79-88, and optionally, wherein the first and second intervals comprise Discrete Fourier Transform (DFT) intervals.

Example 90 includes the subject matter of any one of Examples 79-89, and optionally, wherein the apparatus is configured to cause the wireless station to receive the SC STBC transmission over a Directional Multi-Gigabit (DMG) band.

Example 91 includes the subject matter of any one of Examples 79-90, and optionally, wherein the wireless station is a Directional Multi-Gigabit (DMG) Station (STA).

Example 92 includes the subject matter of any one of Examples 79-91, and optionally, comprising the one or more antennas.

Example 93 includes the subject matter of any one of Examples 79-92, and optionally, comprising a radio, a memory, and a processor.

Example 94 includes a system of wireless communication comprising a wireless station, the wireless station comprising one or more antennas; a radio; a memory; a processor; and a controller configured to cause the wireless station to process a Single Carrier (SC) Space Time Block Coding (STBC) transmission received via the one or more antennas; and demodulate the SC STBC transmission according to a STBC structure of a plurality of streams of the SC STBC transmission, the plurality of streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream comprising, in the second interval, a time-inverted complex conjugate of the first data sequence followed by the second GI sequence.

Example 95 includes the subject matter of Example 94, and optionally, wherein the controller is configured to cause the wireless station to demodulate the SC STBC transmission according to a Linear Minimum Mean Square Error (LMMSE) scheme.

Example 96 includes the subject matter of Example 94 or 95, and optionally, wherein the first GI sequence is different from the second GI sequence.

Example 97 includes the subject matter of any one of Examples 94-96, and optionally, wherein each of the first and second GI sequences has a length of M samples, and each of the first and second data sequences has a length of (N−M) samples, wherein N denotes a Discrete Fourier Transform (DFT) size of each of the first and second intervals.

Example 98 includes the subject matter of any one of Examples 94-97, and optionally, wherein the first GI sequence and the second GI sequence have a same length.

Example 99 includes the subject matter of any one of Examples 94-98, and optionally, wherein each of the first and second GI sequences has a length of 32 samples or 64 samples.

Example 100 includes the subject matter of any one of Examples 94-99, and optionally, wherein each of the first and second GI sequences comprises a Golay sequence.

Example 101 includes the subject matter of any one of Examples 94-100, and optionally, wherein the plurality of streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space time stream comprising, in the second interval, a sign-inverted and time-inverted complex conjugate of the fourth data sequence followed by the third GI sequence, the fourth stream comprising, in the second interval, a time-inverted complex conjugate of the third data sequence followed by the fourth GI sequence.

Example 102 includes the subject matter of any one of Examples 94-101, and optionally, wherein the SC STBC transmission comprises an NT×NR SC transmission, wherein NT is an integer equal to or greater than 2, and NR is an integer equal to or greater than 1.

Example 103 includes the subject matter of any one of Examples 94-102, and optionally, wherein the SC STBC transmission comprises a SC Multiple-Input-Multiple-Output (MIMO) transmission.

Example 104 includes the subject matter of any one of Examples 94-103, and optionally, wherein the first and second intervals comprise Discrete Fourier Transform (DFT) intervals.

Example 105 includes the subject matter of any one of Examples 94-104, and optionally, wherein the controller is configured to cause the wireless station to receive the SC STBC transmission over a Directional Multi-Gigabit (DMG) band.

Example 106 includes the subject matter of any one of Examples 94-105, and optionally, wherein the wireless station is a Directional Multi-Gigabit (DMG) Station (STA).

Example 107 includes a method to be performed at a wireless station, the method comprising processing a Single Carrier (SC) Space Time Block Coding (STBC) transmission received via one or more antennas of the wireless station; and demodulating the SC STBC transmission according to a STBC structure of a plurality of streams of the SC STBC transmission, the plurality of streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream comprising, in the second interval, a time-inverted complex conjugate of the first data sequence followed by the second GI sequence.

Example 108 includes the subject matter of Example 107, and optionally, comprising demodulating the SC STBC transmission according to a Linear Minimum Mean Square Error (LMMSE) scheme.

Example 109 includes the subject matter of Example 107 or 108, and optionally, wherein the first GI sequence is different from the second GI sequence.

Example 110 includes the subject matter of any one of Examples 107-109, and optionally, wherein each of the first and second GI sequences has a length of M samples, and each of the first and second data sequences has a length of (N−M) samples, wherein N denotes a Discrete Fourier Transform (DFT) size of each of the first and second intervals.

Example 111 includes the subject matter of any one of Examples 107-110, and optionally, wherein the first GI sequence and the second GI sequence have a same length.

Example 112 includes the subject matter of any one of Examples 107-111, and optionally, wherein each of the first and second GI sequences has a length of 32 samples or 64 samples.

Example 113 includes the subject matter of any one of Examples 107-112, and optionally, wherein each of the first and second GI sequences comprises a Golay sequence.

Example 114 includes the subject matter of any one of Examples 107-113, and optionally, wherein the plurality of streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space time stream comprising, in the second interval, a sign-inverted and time-inverted complex conjugate of the fourth data sequence followed by the third GI sequence, the fourth stream comprising, in the second interval, a time-inverted complex conjugate of the third data sequence followed by the fourth GI sequence.

Example 115 includes the subject matter of any one of Examples 107-114, and optionally, wherein the SC STBC transmission comprises an NT×NR SC transmission, wherein NT is an integer equal to or greater than 2, and NR is an integer equal to or greater than 1.

Example 116 includes the subject matter of any one of Examples 107-115, and optionally, wherein the SC STBC transmission comprises a SC Multiple-Input-Multiple-Output (MIMO) transmission.

Example 117 includes the subject matter of any one of Examples 107-116, and optionally, wherein the first and second intervals comprise Discrete Fourier Transform (DFT) intervals.

Example 118 includes the subject matter of any one of Examples 107-117, and optionally, comprising receiving the SC STBC transmission over a Directional Multi-Gigabit (DMG) band.

Example 119 includes the subject matter of any one of Examples 107-118, and optionally, wherein the wireless station is a Directional Multi-Gigabit (DMG) Station (STA).

Example 120 includes a product comprising one or more tangible computer-readable non-transitory storage media comprising computer-executable instructions operable to, when executed by at least one computer processor, enable the at least one computer processor to cause a wireless station to process a Single Carrier (SC) Space Time Block Coding (STBC) transmission received via one or more antennas of the wireless station; and demodulate the SC STBC transmission according to a STBC structure of a plurality of streams of the SC STBC transmission, the plurality of streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream comprising, in the second interval, a time-inverted complex conjugate of the first data sequence followed by the second GI sequence.

Example 121 includes the subject matter of Example 120, and optionally, wherein the instructions, when executed, cause the wireless station to demodulate the SC STBC transmission according to a Linear Minimum Mean Square Error (LMMSE) scheme.

Example 122 includes the subject matter of Example 120 or 121, and optionally, wherein the first GI sequence is different from the second GI sequence.

Example 123 includes the subject matter of any one of Examples 120-122, and optionally, wherein each of the first and second GI sequences has a length of M samples, and each of the first and second data sequences has a length of (N−M) samples, wherein N denotes a Discrete Fourier Transform (DFT) size of each of the first and second intervals.

Example 124 includes the subject matter of any one of Examples 120-123, and optionally, wherein the first GI sequence and the second GI sequence have a same length.

Example 125 includes the subject matter of any one of Examples 120-124, and optionally, wherein each of the first and second GI sequences has a length of 32 samples or 64 samples.

Example 126 includes the subject matter of any one of Examples 120-125, and optionally, wherein each of the first and second GI sequences comprises a Golay sequence.

Example 127 includes the subject matter of any one of Examples 120-126, and optionally, wherein the plurality of streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space time stream comprising, in the second interval, a sign-inverted and time-inverted complex conjugate of the fourth data sequence followed by the third GI sequence, the fourth stream comprising, in the second interval, a time-inverted complex conjugate of the third data sequence followed by the fourth GI sequence.

Example 128 includes the subject matter of any one of Examples 120-127, and optionally, wherein the SC STBC transmission comprises an NTxNR SC transmission, wherein NT is an integer equal to or greater than 2, and NR is an integer equal to or greater than 1.

Example 129 includes the subject matter of any one of Examples 120-128, and optionally, wherein the SC STBC transmission comprises a SC Multiple-Input-Multiple-Output (MIMO) transmission.

Example 130 includes the subject matter of any one of Examples 120-129, and optionally, wherein the first and second intervals comprise Discrete Fourier Transform (DFT) intervals.

Example 131 includes the subject matter of any one of Examples 120-130, and optionally, wherein the instructions, when executed, cause the wireless station to receive the SC STBC transmission over a Directional Multi-Gigabit (DMG) band.

Example 132 includes the subject matter of any one of Examples 120-131, and optionally, wherein the wireless station is a Directional Multi-Gigabit (DMG) Station (STA).

Example 133 includes an apparatus of wireless communication by a wireless station, the apparatus comprising means for processing a Single Carrier (SC) Space Time Block Coding (STBC) transmission received via one or more antennas of the wireless station; and means for demodulating the SC STBC transmission according to a STBC structure of a plurality of streams of the SC STBC transmission, the plurality of streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space time stream comprising, in a second interval subsequent to the first interval, a sign-inverted and time-inverted complex conjugate of the second data sequence followed by the first GI sequence, the second stream comprising, in the second interval, a time-inverted complex conjugate of the first data sequence followed by the second GI sequence.

Example 134 includes the subject matter of Example 133, and optionally, comprising means for demodulating the SC STBC transmission according to a Linear Minimum Mean Square Error (LMMSE) scheme.

Example 135 includes the subject matter of Example 133 or 134, and optionally, wherein the first GI sequence is different from the second GI sequence.

Example 136 includes the subject matter of any one of Examples 133-135, and optionally, wherein each of the first and second GI sequences has a length of M samples, and each of the first and second data sequences has a length of (N−M) samples, wherein N denotes a Discrete Fourier Transform (DFT) size of each of the first and second intervals.

Example 137 includes the subject matter of any one of Examples 133-136, and optionally, wherein the first GI sequence and the second GI sequence have a same length.

Example 138 includes the subject matter of any one of Examples 133-137, and optionally, wherein each of the first and second GI sequences has a length of 32 samples or 64 samples.

Example 139 includes the subject matter of any one of Examples 133-138, and optionally, wherein each of the first and second GI sequences comprises a Golay sequence.

Example 140 includes the subject matter of any one of Examples 133-139, and optionally, wherein the plurality of streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space time stream comprising, in the second interval, a sign-inverted and time-inverted complex conjugate of the fourth data sequence followed by the third GI sequence, the fourth stream comprising, in the second interval, a time-inverted complex conjugate of the third data sequence followed by the fourth GI sequence.

Example 141 includes the subject matter of any one of Examples 133-140, and optionally, wherein the SC STBC transmission comprises an NTxNR SC transmission, wherein NT is an integer equal to or greater than 2, and NR is an integer equal to or greater than 1.

Example 142 includes the subject matter of any one of Examples 133-141, and optionally, wherein the SC STBC transmission comprises a SC Multiple-Input-Multiple-Output (MIMO) transmission.

Example 143 includes the subject matter of any one of Examples 133-142, and optionally, wherein the first and second intervals comprise Discrete Fourier Transform (DFT) intervals.

Example 144 includes the subject matter of any one of Examples 133-143, and optionally, comprising means for receiving the SC STBC transmission over a Directional Multi-Gigabit (DMG) band.

Example 145 includes the subject matter of any one of Examples 133-144, and optionally, wherein the wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless station to:
generate a plurality of space-time streams according to a Space Time Block Coding (STBC) structure, the plurality of space-time streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space-time stream comprising, in a second interval subsequent to the first interval, a sign-inverted and time-inverted complex conjugate of the second data sequence followed by the first GI sequence, the second space-time stream comprising, in the second interval, a time-inverted complex conjugate of the first data sequence followed by the second GI sequence, the first GI sequence is different from the second GI sequence, the first GI sequence and the second GI sequence have a same length; and
transmit a Single Carrier (SC) STBC transmission based on the plurality of space-time streams.

2. The apparatus of claim 1, wherein each of the first and second GI sequences has a length of M samples, and each of the first and second data sequences has a length of (N-M) samples, wherein N denotes a Discrete Fourier Transform (DFT) size of each of the first and second intervals.

3. The apparatus of claim 1, wherein each of the first and second GI sequences has a length of 32 samples or 64 samples.

4. The apparatus of claim 1, wherein each of the first and second GI sequences comprises a Golay sequence.

5. The apparatus of claim 1, wherein the plurality of space-time streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space-time stream comprising, in the second interval, a sign-inverted and time-inverted complex conjugate of the fourth data sequence followed by the third GI sequence, the fourth space-time stream comprising, in the second interval, a time-inverted complex conjugate of the third data sequence followed by the fourth GI sequence.

6. The apparatus of claim 1 configured to cause the wireless station to convert the plurality of space-time streams into a respective plurality of frequency-domain streams in a frequency domain, and to map the plurality of frequency domain streams to a plurality of frequency domain spatial streams according to an STBC scheme.

7. The apparatus of claim 6, wherein the STBC scheme comprises an Alamouti scheme.

8. The apparatus of claim 1 configured to cause the wireless station to transmit a first spatial stream of the SC STBC transmission via a first antenna and a second spatial stream of the SC STBC transmission via a second antenna.

9. The apparatus of claim 1, wherein the SC STBC transmission comprises an $N_T \times N_R$ SC transmission, wherein a number of transmit antennas $N_T$ is an integer equal to or greater than 2, and a number of receive antennas $N_R$ is an integer equal to or greater than 1.

10. The apparatus of claim 1, wherein the first and second intervals comprise Discrete Fourier Transform (DFT) intervals.

11. The apparatus of claim 1 configured to cause the wireless station to transmit the SC STBC transmission over a Directional Multi-Gigabit (DMG) band.

12. The apparatus of claim 1, wherein the wireless station is a Directional Multi-Gigabit (DMG) Station (STA).

13. The apparatus of claim 1 comprising a plurality of directional antennas to transmit the SC STBC transmission.

14. The apparatus of claim 1 comprising a radio, a memory, and a processor.

15. A product comprising one or more tangible computer-readable non-transitory storage media comprising computer-executable instructions operable to, when executed by at least one computer processor, enable the at least one computer processor to cause a wireless station to:
generate a plurality of space-time streams according to a Space Time Block Coding (STBC) structure, the plurality of space-time streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space-time stream comprising, in a second interval subsequent to the first interval, a sign-inverted and time-inverted complex conjugate of the second data sequence followed by the first GI sequence, the second space-time stream comprising, in the second interval, a time-inverted complex conjugate of the first data sequence followed by the second GI sequence, the first GI sequence is different from the second GI sequence, the first GI sequence and the second GI sequence have a same length; and
transmit a Single Carrier (SC) STBC transmission based on the plurality of space-time streams.

16. The product of claim 15, wherein each of the first and second GI sequences has a length of M samples, and each of the first and second data sequences has a length of (N-M) samples, wherein N denotes a Discrete Fourier Transform (DFT) size of each of the first and second intervals.

17. The product of claim 15, wherein the instructions, when executed, cause the wireless station to convert the plurality of space-time streams into a respective plurality of frequency-domain streams in a frequency domain, and to map the plurality of frequency domain streams to a plurality of frequency domain spatial streams according to an STBC scheme.

18. An apparatus comprising logic and circuitry configured to cause a wireless station to:
process a Single Carrier (SC) Space Time Block Coding (STBC) transmission received via one or more antennas of the wireless station; and
demodulate the SC STBC transmission according to a STBC structure of a plurality of streams of the SC STBC transmission, the plurality of streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space-time stream comprising, in a second interval subsequent to the first interval, a sign-inverted and time-inverted complex conjugate of the second data sequence followed by the first GI sequence, the second space-time stream comprising, in the second interval, a time-inverted complex conjugate of the first data sequence followed by the second GI sequence, the first GI sequence is different from the second GI sequence, the first GI sequence and the second GI sequence have a same length.

19. The apparatus of claim 18 configured to cause the wireless station to demodulate the SC STBC transmission according to a Linear Minimum Mean Square Error (LMMSE) scheme.

20. The apparatus of claim 18 comprising a radio, a memory, and a processor.

21. A product comprising one or more tangible computer-readable non-transitory storage media comprising computer-executable instructions operable to, when executed by at least one computer processor, enable the at least one computer processor to cause a wireless station to:
process a Single Carrier (SC) Space Time Block Coding (STBC) transmission received via one or more antennas of the wireless station; and
demodulate the SC STBC transmission according to a STBC structure of a plurality of streams of the SC STBC transmission, the plurality of streams comprising at least a first space-time stream and a second space-time stream, the first space-time stream comprising, in a first interval, a first data sequence followed by a first Guard Interval (GI) sequence, the second space-time stream comprising, in the first interval, a second data sequence followed by a second GI sequence, the first space-time stream comprising, in a second interval subsequent to the first interval, a sign-inverted and time-inverted complex conjugate of the second data sequence followed by the first GI sequence, the second space-time stream comprising, in the second interval, a time-inverted complex conjugate of the first data sequence followed by the second GI sequence, the first GI sequence is different from the second GI sequence, the first GI sequence and the second GI sequence have a same length.

22. The product of claim 21, wherein the instructions, when executed, cause the wireless station to demodulate the SC STBC transmission according to a Linear Minimum Mean Square Error (LMMSE) scheme.

23. The product of claim 21, wherein the plurality of streams comprises at least a third space-time stream and a fourth space-time stream, the third space-time stream comprising, in the first interval, a third data sequence followed by a third GI sequence, the fourth space-time stream comprising, in the first interval, a fourth data sequence followed by a fourth GI sequence, the third space-time stream comprising, in the second interval, a sign-inverted and time-inverted complex conjugate of the fourth data sequence followed by the third GI sequence, the fourth space-time stream comprising, in the second interval, a time-inverted complex conjugate of the third data sequence followed by the fourth GI sequence.

* * * * *